US012330674B2

(12) United States Patent
Kadowaki et al.

(10) Patent No.: US 12,330,674 B2
(45) Date of Patent: *Jun. 17, 2025

(54) TRAFFIC SAFETY SUPPORT SYSTEM

(71) Applicant: HONDA MOTOR CO., LTD., Tokyo (JP)

(72) Inventors: Hideo Kadowaki, Saitama (JP); Shigeru Inoue, Saitama (JP); Yuji Takagi, Saitama (JP); Yoshitaka Mimura, Saitama (JP); Masaki Okumoto, Saitama (JP); Akihito Kimata, Saitama (JP); Takahiro Kurehashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 18/190,986

(22) Filed: Mar. 28, 2023

(65) Prior Publication Data

US 2023/0311927 A1    Oct. 5, 2023

(30) Foreign Application Priority Data

Mar. 31, 2022   (JP) ................. 2022-061148

(51) Int. Cl.
*B60Q 1/00*      (2006.01)
*B60W 30/09*     (2012.01)
(Continued)

(52) U.S. Cl.
CPC ............ *B60W 50/16* (2013.01); *B60W 30/09* (2013.01); *B60W 30/0956* (2013.01);
(Continued)

(58) Field of Classification Search
CPC .. B60W 50/16; B60W 30/09; B60W 30/0956; B60W 2050/143;
(Continued)

(56) References Cited

U.S. PATENT DOCUMENTS 6,720,920 B2    4/2004 Breed et al.
9,434,382 B1*   9/2016 Prokhorov ........ B60W 60/0027
(Continued)

FOREIGN PATENT DOCUMENTS

EP    2944531 A1    11/2015
JP    2009255629 A    11/2009
(Continued)

OTHER PUBLICATIONS

Notification of Reasons for Refusal issued in the JP Patent Application No. 2022-061148, mailed on Feb. 6, 2024.
(Continued)

*Primary Examiner* — Toan N Pham
(74) *Attorney, Agent, or Firm* — CKC & Partners Co., LLC

(57) ABSTRACT

Provided is a traffic safety support system capable of improving traffic safety in a situation in which it is predicted that a mobile body other than a host vehicle is shielded by a nearby vehicle present near the mobile body. A traffic safety support system includes a recognizer, a HMI, a risk notification setting unit, and a risk notification control device. The risk notification setting unit sets a notification mode to a hinting notification mode in a case where a motorcycle acts as an oncoming mobile body, and where a four-wheeled automobile is present near the motorcycle and is approaching a four-wheeled automobile from the front in the traveling direction of the four-wheeled automobile, and sets the notification mode to an analogue notification mode in a case where the motorcycle is present within an analogue notification range.

9 Claims, 6 Drawing Sheets

(51) Int. Cl.
  *B60W 30/095* (2012.01)
  *B60W 50/16* (2020.01)
  *B60W 50/14* (2020.01)

(52) U.S. Cl.
  CPC . *B60W 2050/143* (2013.01); *B60W 2050/146* (2013.01); *B60W 2300/36* (2013.01)

(58) Field of Classification Search
  CPC ....... B60W 2050/146; B60W 2300/36; B60W 2554/4026; B60W 2554/4046; B60W 30/18154; B60W 30/18159; B60W 2554/4045; B60W 2554/80; B60W 50/14; G08G 1/166; G08G 1/161
  See application file for complete search history.

(56) References Cited

U.S. PATENT DOCUMENTS

| | | | |
|---|---|---|---|
| 10,460,534 B1 * | 10/2019 | Brandmaier | G07C 5/008 |
| 11,644,834 B2 | 5/2023 | Ditty et al. | |
| 12,079,006 B2 | 9/2024 | Hill et al. | |
| 2008/0015772 A1 | 1/2008 | Sanma et al. | |
| 2014/0368330 A1 | 12/2014 | Watanabe et al. | |
| 2017/0036673 A1 | 2/2017 | Lee | |
| 2017/0084177 A1 | 3/2017 | Matsuoka et al. | |
| 2017/0140651 A1 | 5/2017 | Lee et al. | |
| 2017/0148318 A1 | 5/2017 | Heckmann | |
| 2018/0086346 A1 | 3/2018 | Fujisawa et al. | |
| 2019/0016345 A1 | 1/2019 | Kitagawa | |
| 2019/0243371 A1 * | 8/2019 | Nister | G05D 1/65 |
| 2019/0283671 A1 | 9/2019 | Shimomura et al. | |
| 2019/0283742 A1 | 9/2019 | Kawabe et al. | |
| 2020/0010082 A1 | 1/2020 | Matsunaga | |
| 2020/0080863 A1 | 3/2020 | Ichinokawa | |
| 2022/0165160 A1 | 5/2022 | Maeda et al. | |
| 2022/0292963 A1 | 9/2022 | Kita | |
| 2022/0379917 A1 * | 12/2022 | Henke | B60W 60/0015 |
| 2022/0383421 A1 | 12/2022 | Grivel et al. | |
| 2023/0073966 A1 | 3/2023 | Caveney | |
| 2023/0076969 A1 | 3/2023 | Kim | |
| 2023/0122119 A1 * | 4/2023 | Wu | G05D 1/0289 701/301 |
| 2023/0186767 A1 | 6/2023 | Freischem | |
| 2023/0234574 A1 | 7/2023 | Funabashi et al. | |
| 2023/0234575 A1 | 7/2023 | Iwase et al. | |
| 2023/0311922 A1 * | 10/2023 | Kimata | B60W 50/14 |
| 2023/0311927 A1 | 10/2023 | Kadowaki et al. | |
| 2023/0326344 A1 * | 10/2023 | Kimata | G08G 1/166 |
| 2023/0351895 A1 * | 11/2023 | Kadowaki | B60W 50/16 |
| 2024/0107376 A1 | 3/2024 | Chakraborty et al. | |

FOREIGN PATENT DOCUMENTS

| | | |
|---|---|---|
| JP | 2010097261 A | 4/2010 |
| JP | 2014146177 A | 8/2014 |
| JP | 2017120473 A | 7/2017 |
| JP | 2018181061 A | 11/2018 |
| JP | 2021136001 A | 9/2021 |
| JP | 2021197009 A | 12/2021 |
| WO | 2020086026 A2 | 4/2020 |

OTHER PUBLICATIONS

Office Action issued Dec. 10, 2024 in the U.S. Appl. No. 18/190,134.
Office Action issued Mar. 5, 2025 in the U.S. Appl. No. 18/190,077.
Office Action issued Mar. 27, 2025 in the U.S. Appl. No. 18/190,042.

* cited by examiner

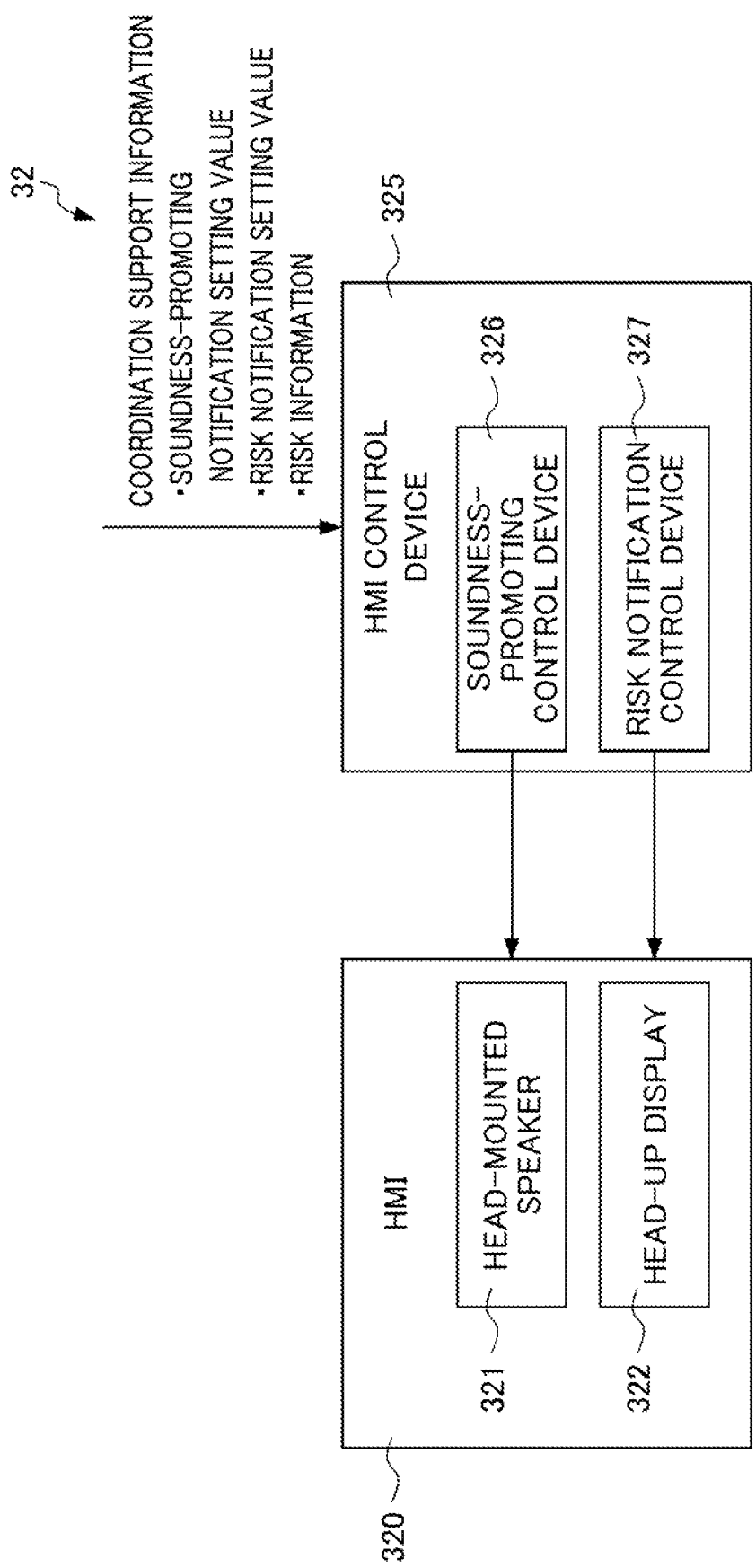

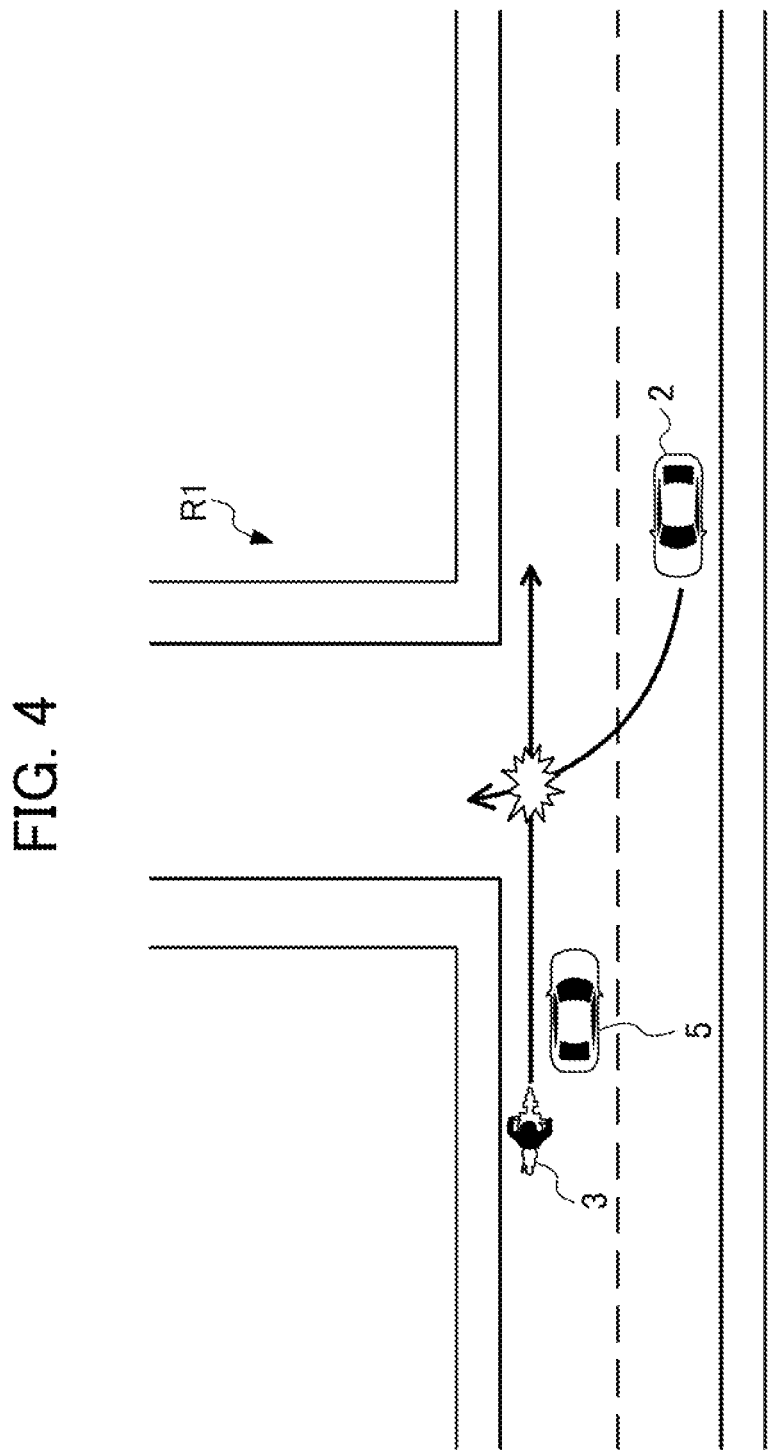

TRAFFIC SAFETY SUPPORT SYSTEM

This application is based on and claims the benefit of priority from Japanese Patent Application No. 2022-061148, filed on 31 Mar. 2022, the content of which is incorporated herein by reference.

BACKGROUND OF THE INVENTION

Field of the Invention

The present invention relates to a traffic safety support system. More specifically, the present invention relates to a traffic safety support system that assists a driver in driving a support target which is a mobile body.

Related Art

In public traffic, various traffic participants, such as mobile bodies including four-wheeled automobiles, motorcycles, bicycles, etc. as well as pedestrians, move at different speeds in accordance with their individual intentions. Japanese Unexamined Patent Application, Publication No. 2021-136001 discloses a driving assistance apparatus as a technique for improving safety, convenience, etc. of the traffic participants in public traffic. The driving assistance apparatus performs driving assistance control based on information regarding a traveling state of a vehicle and information regarding a surrounding environment of the vehicle at the time when an occupant of the vehicle has sensed a hazard, in combination with a predicted hazardous state, whereby the driving assistance apparatus gives a warning or executes an intervention in traveling control, without obstructing smooth traveling even when a plurality of objects are present.

Patent Document 1: Japanese Unexamined Patent Application, Publication No. 2021-136001

SUMMARY OF THE INVENTION

According to the conventional driving assistance techniques, a notification is provided to a driver of a host vehicle when there is a possibility that another mobile body collides with the host vehicle. However, in a case where the other mobile body is shielded by a nearby vehicle present near the other mobile body, an external sensor or the like cannot detect the other mobile body and an accurate notification cannot be provided to the driver of the host vehicle, and an adequate level of traffic safety cannot be ensured.

It is an object of the present invention to provide a traffic safety support system capable of improving traffic safety in a situation in which it is predicted that a mobile body other than a host vehicle is shielded by a nearby vehicle present near the mobile body.

(1) One aspect of the present invention is directed to a traffic safety support system (e.g., a traffic safety support system 1 to be described later) for assisting a driver in driving a support target being a first mobile body (e.g., a four-wheeled automobile 2 to be described later). The traffic safety support system includes: a recognizer (e.g., an on-board driving assistance device 21, an on-board communication device 24, a portable information processing terminal 25, an on-board driving assistance device 31, an on-board communication device 34, a portable information processing terminal 35, a portable information processing terminal 40, a traffic light control device 55, an infrastructure camera 56, a target traffic area recognition unit 60, and a traffic environment database 67 to be described later) configured to recognize a traffic participant and a traffic environment in a monitoring area surrounding the support target; a human-machine interface (e.g., a HMI 220, a HMI 320, and a HMI 420 to be described later) configured to be operated in a manner perceptible to the driver; a notification mode specifier (e.g., a risk notification setting unit 64 to be described later) configured to set a notification mode of the human-machine interface based on a recognition result from the recognizer during a period in which presence of a second mobile body (e.g., a motorcycle 3 to be described later) outside a first range (e.g., an ADAS actuation range to be described later) is recognized by the recognizer, the first range being inside the monitoring area and centered around the support target; and a notification controller (e.g., a risk notification control device 227, a risk notification control device 327, and a HMI control device 425 to be described later) configured to operate the human-machine interface in a first notification manner in a case where the notification mode is set to a first mode (e.g., a hinting notification mode to be described later), and operate the man-machine interface in a second notification manner a notification intensity of which is higher than that of the first notification manner in a case where the notification mode is set to a second mode (e.g., an analogue notification mode to be described later). The notification mode specifier sets the notification mode to the first mode in a case where the second mobile body is present outside a second range encompassing the first range and acts as an oncoming mobile body approaching the support target from front in a traveling direction of the support target and where a third mobile body is present near the second mobile body and is approaching the support target from the front in the traveling direction of the support target. The notification mode specifier sets the notification mode to the second mode in a case where the second mobile body is present within the second range.

(2) In the above case, when the notification mode is set to the second mode, the notification mode specifier preferably changes the notification intensity in accordance with a degree of risk between the support target and the second mobile body.

(3) In the above case, when the third mobile body is present outside a predetermined range between the second mobile body and the third mobile body, the notification mode specifier preferably sets the notification mode to the first mode.

(4) In the above case, when the traffic environment in the monitoring area recognized by the recognizer is in a predetermined state, the notification mode specifier preferably sets the notification mode to the first mode.

(5) Preferably, the traffic safety support system further includes a driving subject characteristic acquirer (e.g., a driving subject characteristic information acquisition unit 61 to be described later) configured to acquire driving subject characteristic information regarding a driver of the second mobile body. When the driving subject characteristic information regarding the driver of the second mobile body acquired by the driving subject characteristic acquirer indicates a characteristic that the second mobile body slides past a side of an other mobile body upon approaching the other mobile body, the notification mode specifier preferably sets the notification mode to the first mode.

(6) Preferably, the traffic safety support system further includes a predictor (e.g., a prediction unit 62 to be described later) configured to predict futures of mobile bodies recognized as traffic participants by the recognizer. When a first predictive travel route for the support target predicted by the predictor and a second predictive travel route for the second mobile body predicted by the predictor overlap with each other, the notification mode specifier preferably sets the notification mode to the second mode.

(7) In the above case, the second mobile body is preferably a two-wheeled vehicle.

(8) In the above case, the support target preferably includes a driving assistor (e.g., an on-board driving assistance device 21 and an on-board driving assistance device 31 to be described later) configured to automatically operate at least one of a braking device or a steering device of the support target on a condition that a mobile body that has possibility of coming into contact with the support target is present within the first range.

(9) Another aspect of the present invention is directed to a traffic safety support system (e.g., a traffic safety support system 1 to be described later) for assisting a driver in driving a support target being a first mobile body (e.g., a four-wheeled automobile 2 to be described later). The traffic safety support system includes: a recognizer (e.g., an on-board driving assistance device 21, an on-board communication device 24, a portable information processing terminal 25, an on-board driving assistance device 31, an on-board communication device 34, a portable information processing terminal 35, a portable information processing terminal 40, a traffic light control device 55, an infrastructure camera 56, a target traffic area recognition unit 60, and a traffic environment database 67 to be described later) configured to recognize a traffic participant and a traffic environment in a monitoring area surrounding the support target; a human-machine interface (e.g., a HMI 220, a HMI 320, and a HMI 420 to be described later) configured to be operated in a manner perceptible to the driver; a notification mode specifier (e.g., a risk notification setting unit 64 to be described later) configured to set a notification mode of the human-machine interface based on a recognition result from the recognizer during a period in which presence of a second mobile body outside a first range is recognized by the recognizer, the first range being inside the monitoring area and centered around the support target; and a notification controller (e.g., a risk notification control device 227, a risk notification control device 327, and a HMI control device 425 to be described later) configured to operate the human-machine interface in a first notification manner in a case where the notification mode is set to a first mode (e.g., a hinting notification mode to be described later), and operate the human-machine interface in a second notification manner a notification intensity of which is higher than that of the first notification manner in a case where the notification mode is set to a second mode (e.g., an analogue notification mode to be described later). The notification mode specifier sets the notification mode to the first mode in a case where the second mobile body is present outside a second range encompassing the first range and it is determined, based on a recognition result from the recognizer, that there is a possibility that the second mobile body slides past a side of a third mobile body present near the second mobile body upon approaching the third mobile body. The notification mode specifier sets the notification mode to the second mode in a case where the second mobile body is present within the second range.

(1) According to the traffic safety support system of the present invention, the notification controller operates the human-machine interface in the first notification manner in a case where the notification mode is set to the first mode, and operates the human-machine interface in the second notification manner a notification intensity of which is higher than that of the first notification manner in a case where the notification mode is set to the second mode. The notification mode specifier sets the notification mode to the first mode in a case where the second mobile body is present outside the second range and acts as an oncoming mobile body approaching the support target from front in a traveling direction of the support target and where a third mobile body is present near the second mobile body and is approaching the support target from the front in the traveling direction of the support target, and sets the notification mode to the second mode in a case where the second mobile body is present within the second range. Due to this feature, the traffic safety support system of the present invention can provide a notification in the first notification manner in advance when the third mobile body is present near the second mobile body, and can provide a notification in the second notification manner when the second mobile body has approached the first mobile body as the support target. The traffic safety support system provides a notification in advance in the first notification manner the notification intensity of which is less than that of the second notification manner, thereby achieving both mitigation of annoyance caused by the notification to the driver and securing of the traffic safety for the first mobile body and the second mobile body.

(2) According to the traffic safety support system of the present invention, the notification mode specifier changes the notification intensity in accordance with a degree of risk between the support target and the second mobile body. Due to this feature, when the degree of risk is high, the traffic safety support system can notify with high intensity the approach of the second mobile body to the driver of the support target, whereas when the degree of risk is low, the traffic safety support system can notify the presence of the second mobile body to the driver at a level not annoying the driver.

(3) In the traffic safety support system according to the present invention, the notification mode specifier sets the notification mode to the first mode in a case where the third mobile body is present outside the predetermined range between the second mobile body and the third mobile body. Due to this feature, when the third mobile body is present outside the predetermined range between the second mobile body and the third mobile body, for example, when the second mobile body is going to slide past a side of the third mobile body, the traffic safety support system can provide a notification to the driver in advance, thereby ensuring safety.

(4) In the traffic safety support system according to the present invention, the notification mode specifier sets the notification mode to the first mode in a case where the traffic environment in the monitoring area recognized by the recognizer is in the predetermined state. Due to this feature, in a case where a road in the monitoring area is congested, the traffic safety support system of the present invention can provide in advance the driver with a notification that there is a possibility that the second mobile body slides past a side of the third mobile body, thereby ensuring safety.

(5) In the traffic safety support system according to the present invention, the notification mode specifier sets the notification mode to the first mode in a case where the driving subject characteristic information regarding the driver of the second mobile body acquired by the driving subject characteristics acquirer indicates a characteristic that the second mobile body slides past a side of another mobile body upon approaching the other mobile body. Due to this feature, in the case where the driving subject characteristic information regarding the driver of the second mobile body indicates a characteristic that the second mobile body slides past a side of another mobile body, the traffic safety support system of the present invention can provide in advance the driver of the first mobile body as the support target with a notification that there is the possibility that the second mobile body slides past a side of the third mobile body, thereby ensuring safety.

(6) According to the traffic safety support system of the present invention, the notification mode specifier sets the notification mode to the second mode in a case where the first predictive travel route for the support target and the second predictive travel route for the second mobile body overlap with each other, i.e., in a case where a movement vector of the support target and a movement vector of the second mobile body overlap with each other. Due to this feature, the traffic safety support system of the present invention provides a notification in the second mode in the case where the movement vector of the first mobile body as the support target overlaps with the movement vector of the second mobile body. Thus, the traffic safety support system can provide a notification in the second mode when there is a possibility that the first mobile body and the second mobile body collide with each other, thereby achieving both mitigation of annoyance caused by the notification to the driver and securing of the traffic safety.

(7) According to the traffic safety support system of the present invention, the second mobile body is a two-wheeled vehicle. Due to this feature, in a situation in which the first mobile body as the host vehicle turns right or moves straight ahead while the two-wheeled vehicle as the second mobile body turns right or moves straight ahead, the traffic safety support system can achieve both mitigation of annoyance caused by the notification to the driver and securing of the traffic safety.

(8) According to the traffic safety support system of the present invention, the support target includes the on-board driving assistance device that automatically operates at least one of the braking device or the steering device of the support target on the condition that a mobile body that can come into contact with the support target is present within the first range. Due to this feature, the traffic safety support system of the present invention can reduce, by means of the on-board driving assistance device, the possibility that the first mobile body and the second mobile body collide with each other, and can secure the traffic safety.

(9) According to the traffic safety support system of the present invention, the notification controller operates the human-machine interface in the first notification manner in a case where the notification mode is set to the first mode, and operates the human-machine interface in the second notification manner a notification intensity of which is higher than that of the first notification manner in a case where the notification mode is set to the second mode. The notification mode specifier sets the notification mode to the first mode in a case where the second mobile body is present outside the second range encompassing the first range and where it is determined, based on a recognition result from the recognizer, that there is a possibility that the second mobile body slides past a side of the third mobile body upon approaching the third mobile body. The notification mode specifier sets the notification mode to the second mode in a case where the second mobile body is present within the second range. Due to this feature, the traffic safety support system of the present invention can provide a notification in the first notification manner in advance in the case where the third mobile body is present near the second mobile body, and can provide a notification in the second notification manner when the second mobile body has approached the first mobile body as the support target. Thus, the traffic safety support system of the present invention can achieve both mitigation of annoyance caused by the notification to the driver and securing of the traffic safety for the first mobile body and the second mobile body, by means of the first notification manner in which the notification is provided in advance and the notification of which intensity is less than the second notification manner.

BRIEF DESCRIPTION OF THE DRAWINGS

FIG. 3B is a block diagram illustrating a configuration of a notification device mountable on a motorcycle;

FIG. 4 is a schematic diagram for explaining a situation in which four-wheeled automobiles and a motorcycle are in the vicinity of an intersection of roads which is determined as a monitoring area.

DETAILED DESCRIPTION OF THE INVENTION

A traffic safety support system according to one embodiment of the present invention will be described below with reference to the drawings.

Figure 1:
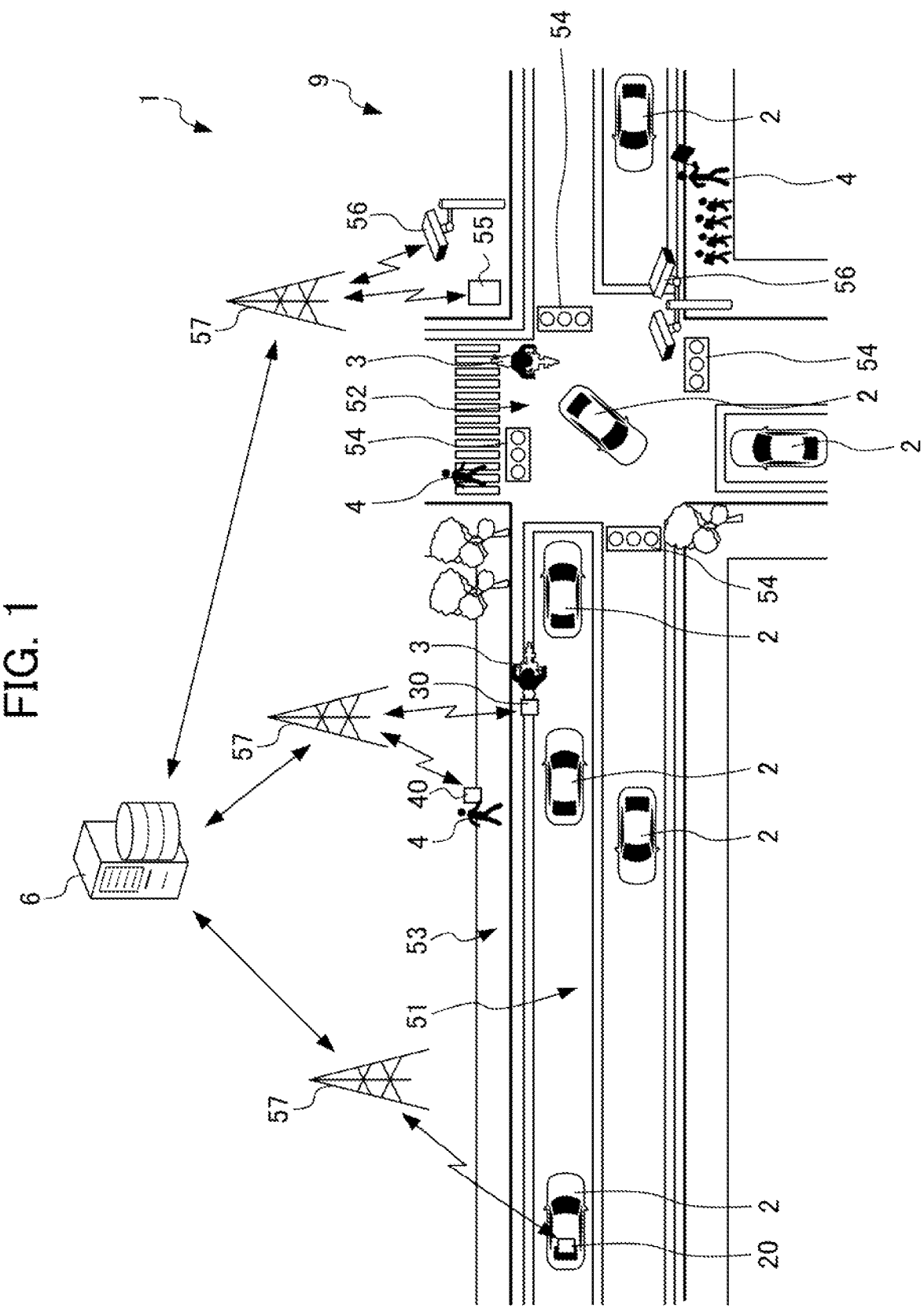
FIG. 1 is a view illustrating a configuration of a traffic safety support system according to one embodiment of the present invention and part of a target traffic area to be supported by the traffic safety support system.

FIG. 1 is a view schematically illustrating a configuration of a traffic safety support system 1 according to the present embodiment and part of a target traffic area 9 in which a traffic participant to be supported by the traffic safety support system 1 is present.

The traffic safety support system 1 assists traffic participants in safely and smoothly moving in the target traffic area 9 in the following manner: the traffic safety support system 1 recognizes, as individual traffic participants, pedestrians 4 that are persons who move in the target traffic area 9 and four-wheeled automobiles 2, motorcycles 3, etc. that are mobile bodies which move in the target traffic area 9, and notifies support information generated through the recognition to each traffic participant to thereby prompt the traffic participants moving according to their intentions to perform mutual communication (specifically, for example, mutual recognition between the traffic participants) and to recognize the surrounding traffic environment.

FIG. 1 illustrates a case where an area located in an urban district, covering an intersection 52 and the vicinity thereof, and including a road 51, the intersection 52, sidewalks 53, and traffic lights 54 as traffic infrastructure is set as the target traffic area 9. In the case illustrated in FIG. 1, a total of seven four-wheeled automobiles 2 and a total of two motorcycles 3 move on the road 51 and at the intersection 52, and a total of three groups of pedestrians 4 move on the sidewalks 53 and at the intersection 52. Further, in the case illustrated in FIG. 1, a total of three infrastructure cameras 56 are installed.

The traffic safety support system 1 includes: on-board equipment 20 that moves together with the respective individual four-wheeled automobile 2 (and that includes not only on-board devices mounted on the individual four-wheeled automobile 2 but also a portable information processing terminal held or worn by the driver who drives the individual four-wheeled automobile 2); on-board equipment 30 that moves together with the respective individual motorcycle 3 (and that includes not only on-board devices mounted on the individual motorcycle 3 but also a portable information processing terminal held or worn by the rider who drives the motorcycle 3); a portable information processing terminal 40 held or worn by the respective pedestrian 4; the plurality of infrastructure cameras 56 installed in the target traffic area 9; a traffic light control device 55 that controls the traffic lights 54; and a coordination support device 6 communicatively connected to the plurality of terminals present in the target traffic area 9 (hereinafter, also referred to collectively as "area terminals"), including the on-board equipment 20 and 30, the portable information processing terminals 40, the infrastructure cameras 56, the traffic light control device 55, etc.

The coordination support device 6 includes one or more computers communicatively connected to the above-described plurality of area terminals via base stations 57. More specifically, the coordination support device 6 includes a server connected to the plurality of area terminals via the base stations 57, a network core, and the Internet. Alternatively or additionally, the coordination support device 6 includes, for example, an edge server connected to the plurality of area terminals via the base stations 57 and a multi-access edge computing (MEC) core.

Figure 2:
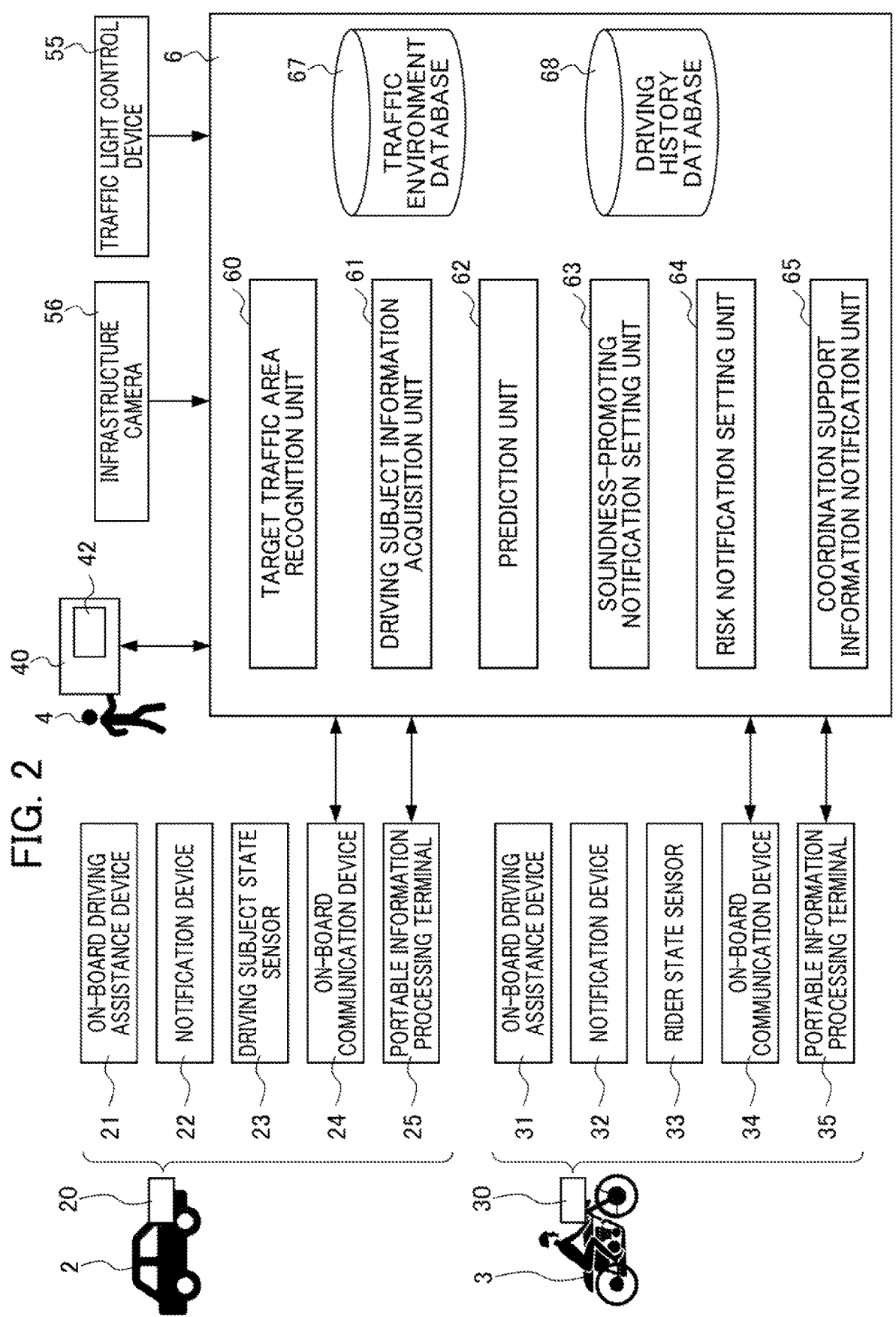
FIG. 2 is a block diagram illustrating configurations of a coordination support device and a plurality of area terminals communicatively connected to the coordination support device.

FIG. 2 is a block diagram illustrating configurations of the coordination support device 6 and the plurality of area terminals communicatively connected to the coordination support device 6.

The on-board equipment 20 mounted on the four-wheeled automobile 2 in the target traffic area 9 includes, for example, an on-board driving assistance device 21 that assists a driver in driving the four-wheeled automobile 2, a notification device 22 that notifies various kinds of information to the driver, a driving subject state sensor 23 that detects a state of the driver engaged in driving, an on-board communication device 24 that performs wireless communication between the four-wheeled automobile 2 as a host vehicle and the coordination support device 6 and other vehicles near the host vehicle, and a portable information processing terminal 25 held or worn by the driver.

The on-board driving assistance device 21 includes an external sensor unit, a host vehicle state sensor, a navigation device, a driving support ECU, and the like. The external sensor unit includes an exterior camera unit that captures an image of the surroundings of the host vehicle, a plurality of on-board external sensors mounted on the host vehicle, such as a radar and a LIDAR (light detection and ranging) that detect a target outside the vehicle using an electromagnetic wave, and an outside recognition device that acquires information regarding a state around the host vehicle by performing sensor fusion processing on detection results obtained by the foregoing on-board external sensors. The host vehicle state sensor includes sensors that acquire information regarding a traveling state of the host vehicle, such as a vehicle speed sensor, an acceleration sensor, a steering angle sensor, a yaw rate sensor, a position sensor, and an orientation sensor. The navigation device includes, for example, a GNSS receiver that identifies a current position of the host vehicle on the basis of a signal received from a global navigation satellite system (GNSS) satellite, and a storage device that stores map information.

The driving support ECU performs driving support control, such as lane departure prevention control, lane change control, preceding vehicle following control, erroneous start prevention control, collision mitigation brake control, and collision avoidance control, on the basis of the information acquired by the external sensor unit, the host vehicle state sensor, the navigation device, etc. Further, the driving support ECU generates driving assistance information for assisting the driver in safe driving, on the basis of the information acquired by the external sensor unit, the host vehicle state sensor, the navigation device, etc., and transmits the driving assistance information to the notification device 22.

Here, on the condition that there is a mobile body that may come into contact with the host vehicle within a predetermined collision mitigation brake-actuation range centered around the host vehicle, the driving support ECU starts the collision mitigation brake control to automatically operate a braking device of the host vehicle so as to reduce damage that can be caused by contact of the host vehicle with the mobile body. Further, on the condition that there is a mobile body that may come into contact with the host vehicle within a predetermined collision avoidance steering-actuation range centered around the host vehicle, the driving support ECU starts the collision avoidance control to automatically operate a steering device of the host vehicle so as to avoid contact of the host vehicle with the mobile body. In the following description, the collision mitigation brake-actuation range and the collision avoidance steering-actuation range may be referred to collectively as "ADAS actuation range".

The driving subject state sensor 23 includes various devices that acquire time-series data of information correlating with driving capability of the driver engaged in driving. For example, the driving subject state sensor 23 includes: an on-board camera that detects a direction of sight line of the driver engaged in driving, whether or not the driver's eyes are open, etc.; a seatbelt sensor that is provided to a seatbelt fastenable on the driver's body, and detects a pulse of the driver, whether or not the driver is breathing, etc.; a steering sensor that is provided to the steering wheel that the driver grips, and detects a skin potential of the driver; and an on-board microphone that detects whether or not there is conversation between the driver and a passenger.

The on-board communication device 24 has a function of transmitting, to the coordination support device 6, the information acquired by the driving support ECU (including the information acquired by the external sensor unit, the host vehicle state sensor, the navigation device, etc., control information regarding driving support control being executed, and the like), the information regarding the driving subject acquired by the driving subject state sensor 23, etc. The on-board communication device 24 further has a function of receiving coordination support information transmitted from the coordination support device 6 and a function of transmitting the received coordination support information to the notification device 22.

The notification device 22 includes various devices that notify various kinds of information to the driver through, for example, the driver's auditory sense, visual sense, and haptic sense, by causing a human-machine interface (hereinafter, may be abbreviated as "HMI") to operate in a manner that is determined based on the driving assistance information transmitted from the on-board driving assistance device 21 and the coordination support information transmitted from the coordination support device 6.

Figure 3A:
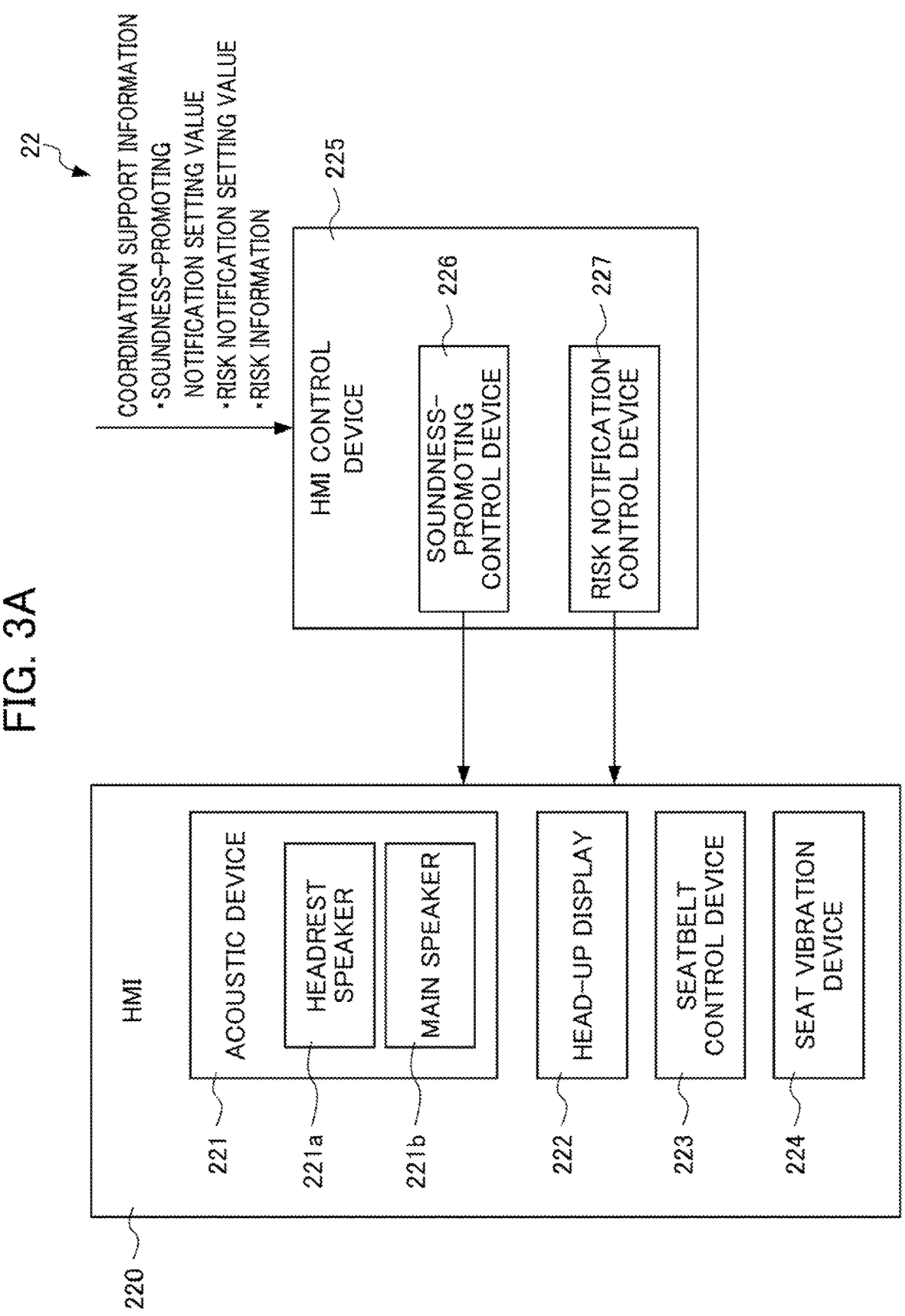
FIG. 3A is a block diagram illustrating a configuration of a notification device mountable on a four-wheeled automobile.

FIG. 3A is a block diagram illustrating a configuration of the notification device 22 mountable on the four-wheeled automobile. Note that FIG. 3A illustrates, among the components forming the notification device 22, only blocks involved particularly in control that is performed based on the coordination support information transmitted from the coordination support device 6.

The notification device 22 includes the HMI 220 that operates in a manner perceptible to the driver, and a HMI control device 225 that causes the HMI 220 to operate based on the coordination support information transmitted from the coordination support device 6.

The HMI 220 includes an acoustic device 221 that operates in a manner auditorily perceptible to the driver, a head-up display 222 that operates in a manner visually perceptible to the driver, and a seatbelt control device 223 and a seat vibration device 224 that operate in a manner haptically perceptible to the driver.

The acoustic device 221 includes a headrest speaker 221a that is provided to a headrest of a driver's seat on which the driver sits and is capable of emitting binaural sound having directivity, and a main speaker 221b that is provided in the vicinity of the driver's seat and a passenger seat. The headrest speaker 221a and the main speaker 221b each emit sound according to a command from the HMI control device 225. The head-up display 222 displays an image according to a command from the HMI control device 225 in a field of view (e.g., a windshield) of the driver engaged in driving. The seatbelt control device 223 changes tension on the seatbelt fastened on the driver's body according to a command from the HMI control device 225. The seat vibration device 224 vibrates the seat on which the driver sits at an amplitude and/or a frequency according to a command from the HMI control device 225.

The HMI control device 225 includes a soundness-promoting control device 226 that operates the HMI 220 in a predetermined manner for bringing the driver's driving capability (in particular, cognitive capability) in a sound state, and a risk notification control device 227 that operates the HMI 220 in a predetermined manner for making the driver recognize the presence of an imminent risk. As will be described later, the coordination support information transmitted from the coordination support device 6 to the four-wheeled automobile 2 includes, for example, information regarding a soundness-promoting notification setting value for the soundness-promoting control device 226 to set a soundness-promoting notification to ON or OFF; information regarding a risk notification setting value for the risk notification control device 227 to set a risk notification to ON or OFF and to specify a type of a notification mode (to be described later); and information regarding an imminent risk to the driver (hereinafter, also referred to as "risk information").

The soundness-promoting notification setting value to be inputted to the soundness-promoting control device 226 is set to one of the following values: "0" for the soundness-promoting control device 226 to set the soundness-promoting notification to OFF; and "1" for the soundness-promoting control device 226 to set the soundness-promoting notification to ON.

In a case where the soundness-promoting notification setting value is set to "0", the soundness-promoting control device 226 sets the soundness-promoting notification to OFF. In other words, when the soundness-promoting notification setting value is set to "0", the soundness-promoting control device 226 does not actuate the HMI 220. Note that this does not prevent the risk notification control device 227 from actuating the HMI 220.

In a case where the soundness-promoting notification setting value is set to "1", the soundness-promoting control device 226 sets the soundness-promoting notification to ON. More specifically, for example, the soundness-promoting control device 226 causes the headrest speaker 221a or the main speaker 221b to reproduce a piece of music that interests the driver, thereby bringing the driver's driving capability into a sound state. At this time, in order to increase a degree of wakefulness of the driver, the beats per minute (BPM) of the piece of music may be changed or a low-pitched sound may be emphasized.

In this way, the soundness-promoting control device 226 operates the HMI 220 in order to bring the driver's driving capability into a sound state. Therefore, when the risk notification by the risk notification control device 227 to be described later is set to ON (i.e., when the risk notification setting value is set to "1" or "2"), the soundness-promoting notification may be switched to OFF so that the driver will not be annoyed. In the present embodiment, a case will be described in which the soundness-promoting control device 226 brings the driver's driving capability into a sound state mainly through the driver's auditory sense by operating the headrest speaker 221a and/or the main speaker 221b, but the present invention is not limited thereto. The soundness-promoting control device 226 may operate, for example, the seatbelt control device 223 and/or the seat vibration device 224.

The risk notification control device 227 is capable of providing a risk notification in a plurality of notification modes different in terms of the device in the HMI 220 to operate or/and the manner in which the device operates. More specifically, the risk notification control device 227 can provide a risk notification in at least one of the following modes: a hinting notification mode intended to make the driver recognize the presence of a potential risk; an analogue notification mode intended to make the driver recognize the presence of a risk that has surfaced and/or a degree of the risk; and a prediction-assisted notification mode intended to notify to the driver information useful for avoiding a predicted risk. Accordingly, the risk notification setting value to be inputted to the risk notification control device 227 is set to one of the following values: "0" for the risk notification control device 227 to set the risk notification to OFF; "1" for the risk notification control device 227 to set the risk notification to ON and to set the notification mode to the hinting notification mode and the prediction-assisted notification mode; and "2" for the risk notification control device 227 to set the risk notification to ON and to set the notification mode to the analog notification mode and the prediction-assisted notification mode.

In a case where the risk notification setting value is set to "0", the risk notification control device 227 sets the risk notification to OFF. In other words, when the risk notification setting value is set to "0", the risk notification control device 227 does not actuate the HMI 220. Note that this does not prevent the soundness-promoting control device 226 from actuating the HMI 220.

In a case where the risk notification setting value is set to "1", the risk notification control device 227 sets the notification mode to the hinting notification mode and the prediction-assisted notification mode, and switches the risk notification to ON in these set notification modes.

In a case where the risk notification setting value is set to "2", the risk notification control device 227 sets the notification mode to the analogue notification mode and the prediction-assisted notification mode, and switches the risk notification to ON in these set notification modes.

Here, when the notification mode is set to the prediction-assisted notification mode, the risk notification control device 227 generates, based on the risk information transmitted from the coordination support device 6, risk avoidance assistance information that is useful for the driver to avoid an imminent risk, and operates the acoustic device 221 and/or the head-up display 222 of the HMI 220 in such a manner as to enable the driver to auditorily and/or visually recognize the risk avoidance assistance information. Here, the risk avoidance assistance information includes, for example, information regarding the position of a traffic participant that may come into contact with the host vehicle (hereinafter, referred to also as "risk-carrying subject"), and information with contents that call driver's attention to the risk-carrying subject.

More specifically, in a case where there is a motorcycle driven by a rider in an unsound state in front of the four-wheeled automobile driven by the driver, the risk notification control device 227 causes the acoustic device 221 and/or the head-up display 222 to reproduce and/or display a message such as "Be careful of hazardous right turn of the motorcycle" as the risk avoidance assistance information for enabling avoidance of contact with the motorcycle. At this time, the risk notification control device 227 may cause the head-up display 222 to display an image showing an arrow(s) indicating a current position and/or a predicted position of the motorcycle, as the risk avoidance assistance information for enabling avoidance of contact with the motorcycle.

In a case where the notification mode is set to the hinting notification mode, the risk notification control device 227 operates the HMI 220 in such a manner as not to annoy the driver, thereby making the driver spontaneously recognize the presence of a risk-carrying subject extracted from the risk information transmitted from the coordination support device 6. Thus, in the hinting notification mode, in order to make the driver spontaneously recognize the presence of the risk-carrying subject without annoying the driver, it is preferable for the risk notification control device 227 to actuate, from among the plurality of devices included in the HMI 220, the headrest speaker 221a that appeals particularly to the driver's auditory sense. More specifically, when the notification mode is set to the hinting notification mode, the risk notification control device 227 causes the headrest speaker 221a to emit, at low volume, a binaural sound effect that is familiar to the driver and is designed to make the driver cast their eyes upon the position of the risk-carrying subject.

In a case where the notification mode is set to the analogue notification, the risk notification control device 227 operates the HMI 220 in a different manner from the manner in the hinting notification mode, thereby making the driver to strongly recognize the presence of a risk-carrying subject extracted from the risk information transmitted from the coordination support device 6 and a degree of risk associated with the risk-carrying subject. Thus, in the analogue notification mode, in order to make the driver strongly recognize the presence of the risk-carrying subject, the risk notification control device 227 operates the HMI 220 in a manner the notification intensity of which is higher than that of the hinting notification mode. Here, the notification intensity refers to intensity for attracting concern and attention of the driver. More specifically, when the notification mode is set to the analogue notification mode, the risk notification control device 227 causes the headrest speaker 221a and/or the main speaker 221b to emit buzzer sound or pulse sound at higher volume than the volume of the sound effect emitted in the hinting notification mode. The buzzer sound and the pulse sound are high-volume sound unfamiliar to the driver in comparison with the sound effect emitted in the hinting notification mode, and thus, have higher notification intensity than the sound effect emitted in the hinting notification mode.

When changing the notification intensity according to a degree of risk as described above, the risk notification control device 227 preferably operates the HMI 220 so as to maximize the notification intensity at a point in time at which the above-described driving support ECU starts to execute the collision mitigation brake control or collision avoidance steering control, in other words, at a point in time at which the risk-carrying subject enters the ADAS actuation range of the host vehicle.

Note that while the present embodiment is described with reference to a case in which the risk notification control device 227 actuates the acoustic device 221 when the notification mode is set to the analogue notification mode, the present invention is not limited thereto. When the notification mode is set to the analogue notification mode, the risk notification control device 227 may actuate the seatbelt control device 223 to change tension of the seatbelt and/or actuate the seat vibration device 224 to vibrate the seat, instead of actuating the acoustic device 221. The seatbelt control device 223 and the seat vibration device 224, which operate in the manner that appeals to the driver's haptic sense, have higher notification intensity than the sound effect emitted in the hinting notification mode. When the notification mode is set to the analogue notification mode, the risk notification control device 227 may actuate the acoustic device 221, the seatbelt control device 223, and the seat vibration device 224 in combination.

As described above, in the analogue notification mode, in order to make the driver strongly recognize not only the presence of a risk-carrying subject but also a degree of the risk associated with the risk-carrying subject, the risk notification control device 227 preferably changes the notification intensity in accordance with the degree of the risk associated with the risk-carrying subject (e.g., the length of a predicted period until a possible collision with the risk-carrying subject) extracted from the risk information transmitted from the coordination support device 6. Specifically, the risk notification control device 227 may increase the volume of the buzzer sound, increase the volume of the pulse sound, or shorten the interval of the pulse sounds as the degree of risk increases (i.e., as the predicted period until the possible collision with the risk-carrying subject shortens). When the seatbelt control device 223 is actuated as described above, the risk notification control device 227 may increase the tension on the seatbelt as the degree of risk increases. When the seat vibration device 224 is actuated as described above, the risk notification control device 227 may increase the amplitude of the vibration on the seat as the degree of risk increases.

Referring back to FIG. 2, the portable information processing terminal 25 includes, for example, a wearable terminal worn by the driver of the four-wheeled automobile 2, a smartphone held by the driver, and the like. The wearable terminal has a function of measuring biometric information of the driver (e.g., a heart rate, a blood pressure, a blood oxygen level, etc.) and transmitting the measurement data of the biometric information to the coordination support device 6, and a function of receiving coordination support information transmitted from the coordination support device 6 and notifying to the driver a message according to the coordination support information by means of an image, voice, warning sound, vibration, etc. The smartphone has a function of transmitting information regarding the driver (e.g., position information, a travel acceleration, schedule information, etc.) to the coordination support device 6 and a function of receiving coordination support information transmitted from the coordination support device 6 and notifying to the driver a message according to the coordination support information by means of an image, voice, warning sound, melody, vibration, etc.

The on-board equipment 30 mounted on the motorcycle 3 in the target traffic area 9 includes, for example, an on-board driving assistance device 31 that assists a rider in driving the motorcycle 3, a notification device 32 that notifies various kinds of information to the rider, a rider state sensor 33 that detects a state of the rider engaged in driving, and a portable information processing terminal 35 held or worn by the rider.

The on-board driving assistance device 31 includes an external sensor unit, a host vehicle state sensor, a navigation device, a driving support ECU, and the like. The external sensor unit includes an exterior camera unit that captures an image of the surroundings of the motorcycle 3 as a host vehicle, a plurality of on-board external sensors mounted on the host vehicle, such as a radar and a LIDAR that detect a target outside the vehicle using an electromagnetic wave, and an outside recognition device that acquires information regarding a state around the host vehicle by performing sensor fusion processing on detection results obtained by the foregoing on-board exterior sensors. The host vehicle state sensor includes sensors that acquire information regarding a traveling state of the host vehicle, such as a vehicle speed sensor and a five-axis or six-axis inertia measurement device. The navigation device includes, for example, a GNSS receiver that identifies a current position on the basis of a signal received from a GNSS satellite, and a storage device that stores map information.

The driving support ECU performs driving support control, such as lane keeping control, lane departure prevention control, lane change control, preceding vehicle following control, erroneous start prevention control, and collision mitigation brake control, on the basis of the information acquired by the external sensor unit, the host vehicle state sensor, the navigation device, etc. Further, the driving support ECU generates driving assistance information for assisting the rider in safe driving, on the basis of the information acquired by the external sensor unit, the host vehicle state sensor, the navigation device, etc., and transmits the driving assistance information to the notification device 32.

Here, on the condition that there is a mobile body that may come into contact with the host vehicle within a predetermined collision mitigation brake-actuation range centered around the host vehicle, the driving support ECU starts the collision mitigation brake control to automatically operate a braking device of the host vehicle so as to reduce damage that can be caused by contact of the host vehicle with the mobile body. Further, on the condition that there is a mobile body that may come into contact with the host vehicle within a predetermined collision avoidance steering-actuating range centered around the host vehicle, the driving support ECU starts the collision avoidance control to automatically operate a steering device of the host vehicle so as to avoid contact of the host vehicle with the mobile body. In the following description, the collision mitigation brake-actuation range and the collision avoidance steering-actuation range may be referred to collectively as "ADAS actuation range".

The rider state sensor 33 includes various devices that acquire information correlating with driving capability of the rider engaged in driving. The rider state sensor 33 includes, for example, a seat sensor that is provided at a seat on which the rider sits and that detects a pulse of the rider, whether or not the rider is breathing, etc.; and a helmet sensor that is provided to a helmet to be worn by the rider and that detects a pulse of the rider, whether or not the rider is breathing, a skin potential, etc.

The on-board communication device 34 has a function of transmitting, to the coordination support device 6, the information acquired by the driving support ECU (including the information acquired by the external sensor unit, the host vehicle state sensor, the navigation device, etc., control information regarding driving assistance control being executed, and the like), information regarding the rider acquired by the rider state sensor 33, etc. The on-board communication device 34 further has a function of receiving coordination support information transmitted from the coordination support device 6 and a function of transmitting the received coordination support information to the notification device 32.

The notification device 32 includes various devices that notify various kinds of information to the rider through, for example, the rider's auditory sense, visual sense, haptic sense, by causing a HMI to operate in a manner determined based on the driving assistance information transmitted from the on-board driving assistance device 31 and the coordination support information transmitted from the coordination support device 6.

FIG. 3B is a block diagram illustrating a configuration of the notification device 32 mountable on the motorcycle. Note that FIG. 3B illustrates, among the components forming the notification device 32, only blocks involved particularly in control that is performed based on the coordination support information transmitted from the coordination support device 6.

The notification device 32 includes the HMI 320 that operates in a manner perceptible to the rider, and a HMI control device 325 that causes the HMI 320 to operate based on the coordination support information transmitted from the coordination support device 6.

The HMI 320 includes a head-mounted speaker 321 that operates in a manner auditorily perceptible to the rider, and a head-up display 322 that operates in a manner visually perceptible to the rider.

The head-mounted speaker 321 is installed in a helmet to be worn by the rider and is capable of emitting binaural sound having directivity. The head-mounted speaker 321 emits sound in accordance with a command from the HMI control device 325. The head-up display 322 displays an image in accordance with a command from the HMI control device 325 within a field of view (e.g., a shield of the helmet) of the rider engaged in driving.

The HMI control device 325 includes a soundness-promoting control device 326 that operates the HMI 320 in a predetermined manner for bringing the rider's driving capability (in particular, cognitive capability) in a sound state, and a risk notification control device 327 that operates the HMI 320 in a predetermined manner for making the rider recognize the presence of an imminent risk. As will be described later, the coordination support information transmitted from the coordination support device 6 to the motorcycle 3 includes, for example, information regarding a soundness-promoting notification setting value for the soundness-promoting control device 326 to set a soundness-promoting notification to ON or OFF; information regarding a risk notification setting value for the risk notification control device 327 to set a risk notification to ON or OFF and to specify a type of a notification mode; and information regarding an imminent risk to the rider.

The soundness-promoting notification setting value to be inputted to the soundness-promoting control device 326 is set to one of the following values: "0" for the soundness-promoting control device 326 to set the soundness-promoting notification to OFF; and "1" for the soundness-promoting control device 326 to set the soundness-promoting notification to ON.

In a case where the soundness-promoting notification setting value is set to "0", the soundness-promoting control device 326 sets the soundness-promoting notification to OFF. In other words, when the soundness-promoting notification setting value is set to "0", the soundness-promoting control device 326 does not actuate the HMI 320. Note that this does not prevent the risk notification control device 327 from actuating the HMI 320.

In a case where the soundness-promoting notification setting value is set to "1", the soundness-promoting control device 326 sets the soundness-promoting notification to ON. More specifically, for example, the soundness-promoting control device 326 causes the head-mounted speaker 321 to reproduce a piece of music that interests the rider, thereby bringing the rider's driving capability into a sound state. At this time, in order to increase a degree of wakefulness of the rider, the beats per minute (BPM) of the piece of music may be changed or a low-pitched sound may be emphasized.

In this way, the soundness-promoting control device 326 operates the HMI 320 in order to bring the rider's driving capability into a sound state. Therefore, when the risk notification by the risk notification control device 327 to be described later is set to ON (i.e., when the risk notification setting value is set to "1" or "2"), the soundness-promoting notification may be switched to OFF so that the rider will not be annoyed.

The risk notification control device 327 is capable of providing a risk notification in a plurality of notification modes different in terms of the device in the HMI 320 to operate or/and the manner in which the device operates. More specifically, the risk notification control device 327 can provide a risk notification in at least one of the following modes: a hinting notification mode intended to make the rider recognize the presence of a potential risk; an analogue notification mode intended to make the rider recognize the presence of a risk that has surfaced and/or a degree of the risk; and a prediction-assisted notification mode intended to notify to the rider information useful for avoiding a predicted risk. Accordingly, the risk notification setting value to be inputted to the risk notification control device 327 is set to one of the following values: "0" for the risk notification control device 327 to set the risk notification to OFF; "1" for the risk notification control device 327 to set the risk notification to ON and to set the notification mode to the hinting notification mode and the prediction-assisted notification mode; and "2" for the risk notification control device 327 to set the risk notification to ON and to set the notification mode to the analog notification mode and the prediction-assisted notification mode.

In a case where the risk notification setting value is set to "0", the risk notification control device 327 sets the risk notification to OFF. In other words, when the risk notification setting value is set to "0", the risk notification control device 327 does not actuate the HMI 320. Note that this does not prevent the soundness-promoting control device 326 from actuating the HMI 320.

In a case where the risk notification setting value is set to "1", the risk notification control device 327 sets the notification mode to the hinting notification mode and the prediction-assisted notification mode, and switches the risk notification to ON in these set notification modes.

In a case where the risk notification setting value is set to "2", the risk notification control device 327 sets the notification mode to the analogue notification mode and the prediction-assisted notification mode, and switches the risk notification to ON in these set notification modes.

Here, when the notification mode is set to the prediction-assisted notification mode, the risk notification control device 327 generates, based on the risk information transmitted from the coordination support device 6, risk avoidance assistance information that is useful for the rider to avoid an imminent risk, and causes the head-mounted speaker 321 and/or the head-up display 322 of the HMI 320 to operate in such a manner as to enable the rider to auditorily and/or visually recognize the risk avoidance assistance information. Here, the risk avoidance assistance information includes, for example, information regarding the position of a risk-carrying subject that may come into contact with the motorcycle as the host vehicle, and information with contents that call rider's attention to the risk-carrying subject.

More specifically, in a case where there is a four-wheeled automobile driven by a driver in an unsound state in front of the motorcycle driven by the rider, the risk notification control device 327 causes the head-mounted speaker 321 and/or the head-up display 322 to reproduce and/or display a message such as "Be careful of hazardous right turn of the four-wheeled automobile" as the risk avoidance assistance information for enabling avoidance of contact with the four-wheeled automobile. At this time, the risk notification control device 327 may cause the head-up display 322 to display an image showing an arrow(s) indicating a current position and/or a predicted position of the four-wheeled automobile, as the risk avoidance assistance information for enabling avoidance of contact with the four-wheeled automobile.

In a case where the notification mode is set to the hinting notification mode, the risk notification control device 327 operates the HMI 320 in such a manner as not to annoy the rider, thereby making the rider spontaneously recognize the presence of a risk-carrying subject extracted from the risk information transmitted from the coordination support device 6. Thus, in the hinting notification mode, in order to make the rider spontaneously recognize the presence of the risk-carrying subject without annoying the rider, it is preferable for the risk notification control device 327 to actuate, from among the plurality of devices included in the HMI 320, the head-mounted speaker 321 that appeals particularly to the rider's auditory sense. More specifically, when the notification mode is set to the hinting notification mode, the risk notification control device 327 causes the head-mounted speaker 321 to emit, at low volume, a binaural sound effect that is familiar to the rider and is designed to make the rider turn the eyes upon the position of the risk-carrying subject.

In a case where the notification mode is set to the analogue notification mode, the risk notification control device 327 operates the HMI 320 in a different manner from the above-described manner in the hinting notification mode, thereby making the rider to strongly recognize the presence of the risk-carrying subject extracted from the risk information transmitted from the coordination support device 6 and a degree of risk associated with the risk-carrying subject. Thus, in the analogue notification mode, in order to make the rider strongly recognize the presence of the risk-carrying subject, the risk notification control device 327 operates the HMI 320 in a manner the notification intensity of which is higher than that of the hinting notification mode. More specifically, in the case where the notification mode is set to the analogue notification mode, the risk notification control device 327 causes the head-mounted speaker 321 to emit buzzer sound or pulse sound at higher volume than the volume of the sound effect emitted in the hinting notification mode. The buzzer sound and the pulse sound are high-volume sound unfamiliar to the rider in comparison with the sound effect emitted in the hinting notification mode, and thus, have higher notification intensity than the sound effect emitted in the hinting notification mode.

As described above, in the analogue notification mode, in order to make the rider strongly recognize not only the presence of a risk-carrying subject but also a degree of the risk associated with the risk-carrying subject, the risk notification control device 327 preferably changes the notification intensity in accordance with the degree of the risk associated with the risk-carrying subject (e.g., the length of a predicted period until a possible collision with the risk-carrying subject) extracted from the risk information transmitted from the coordination support device 6. Specifically, the risk notification control device 327 may increase the volume of the buzzer sound, increase the volume of the pulse sound, or shorten the interval of the pulse sound as the degree of risk increases (i.e., as the predicted period until the possible collision with the risk-carrying subject shortens).

When changing the notification intensity according to a degree of risk as described above, the risk notification control device 327 preferably operates the HMI 320 so as to maximize the notification intensity at a point in time at which the above-described driving support ECU starts to execute the collision mitigation brake control, in other words, at a point in time at which the risk-carrying subject enters the ADAS actuation range of the host vehicle.

Referring back to FIG. 2, the portable information processing terminal 40 held or worn by the pedestrian 4 in the target traffic area 9 includes, for example, a wearable terminal worn by the pedestrian 4, a smartphone held by the pedestrian 4, and the like. The wearable terminal has a function of measuring biometric information of the pedestrian 4 (e.g., a heart rate, a blood pressure, a blood oxygen level, etc.) and transmitting the measurement data of the biometric information to the coordination support device 6, and a function of receiving the coordination support information transmitted from the coordination support device 6. The smartphone has a function of transmitting pedestrian information regarding the pedestrian 4 (e.g., position information, a travel acceleration, schedule information, etc. of the pedestrian 4) to the coordination support device 6 and a function of receiving the coordination support information transmitted from the coordination support device 6.

The portable information processing terminal 40 includes a notification device 42 that operates a HMI in a predetermined manner based on the received coordination support information to thereby notify various kind of information to the pedestrian through, for example, the pedestrian's auditory sense, visual sense, and haptic sense.

Figure 3C:
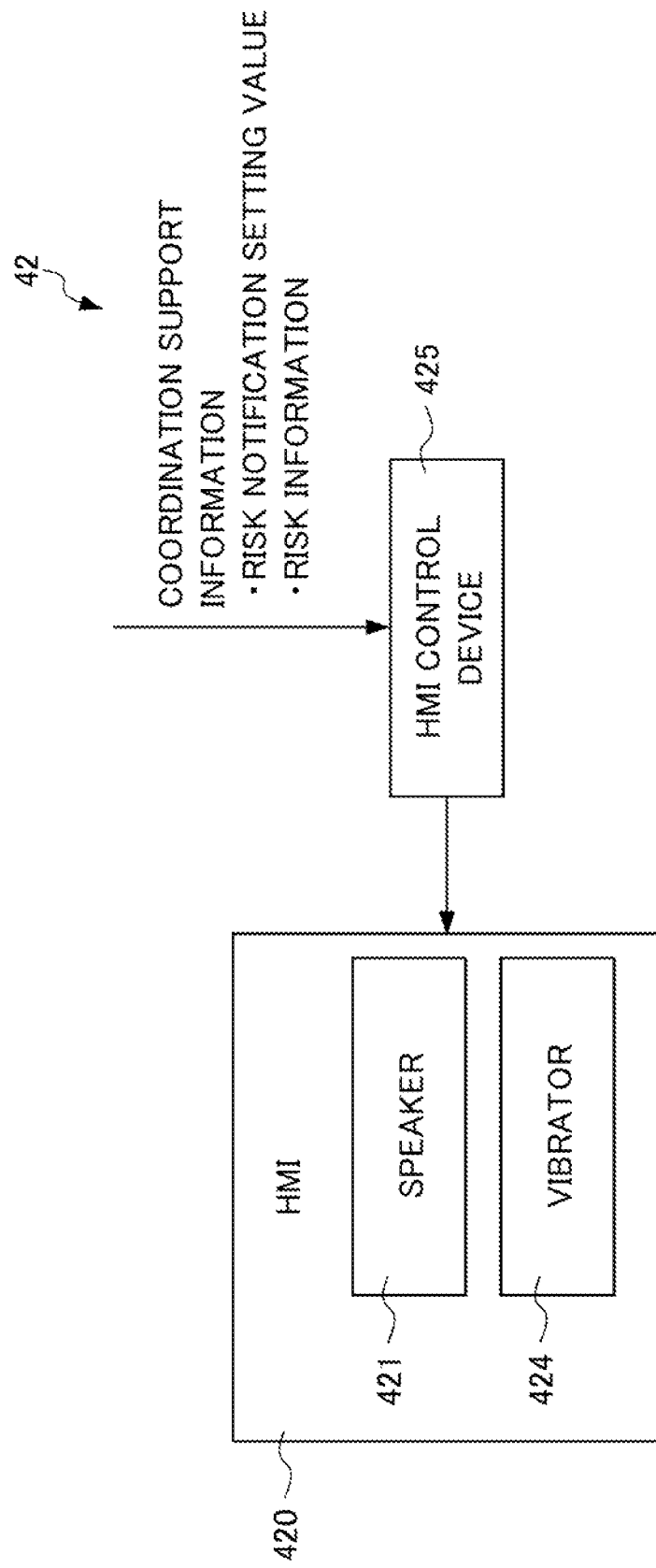
FIG. 3C is a block diagram illustrating a configuration of a notification device mountable on a portable information processing terminal held by a pedestrian.

FIG. 3C is a block diagram illustrating a configuration of the notification device 42 installed in the portable information processing terminal 40. Note that FIG. 3C illustrates, among the components forming the notification device 42, only blocks involved particularly in control that is performed based on the coordination support information transmitted from the coordination support device 6.

The notification device 42 includes the HMI 420 that operates in a manner perceptible to the pedestrian, and a HMI control device 425 that causes the HMI 420 to operate based on the coordination support information transmitted from the coordination support device 6.

The HMI 420 includes a speaker 421 that operates in a manner auditorily perceptible to the pedestrian, and a vibrator 424 that operates in a manner haptically perceptible to the pedestrian.

The speaker 421 emits sound in accordance with a command from the HMI control device 425. The vibrator 424 vibrates the main body of the portable information processing terminal 40 at an amplitude and/or a frequency in accordance with a command from the HMI control device 425.

As will be described later, the coordination support information transmitted from the coordination support device 6 to the portable information processing terminal 40 held by the pedestrian includes information regarding a risk notification setting value for the HMI control device 425 to set a risk notification to ON or OFF and to specify a type of a notification mode, and information regarding an imminent risk to the pedestrian.

The HMI control device 425 is capable of providing a risk notification in a plurality of notification modes different in terms of the device in the HMI 420 to operate or/and the manner in which the device operates. More specifically, the HMI control device 425 can provide the risk notification in at least one of a hinting notification mode intended to make the pedestrian recognize the presence of a potential risk or an analogue notification mode intended to make the pedestrian recognize the presence of a risk that has surfaced and/or a degree of the risk. Accordingly, the risk notification setting value to be inputted to the HMI control device 425 is set to one of the following values: "0" for the HMI control device 425 to set the risk notification to OFF; "1" for the HMI control device 425 to set the risk notification to ON and to set the notification mode to the hinting notification mode;

and "2" for the HMI control device 425 to set the risk notification to ON and to set the notification mode to the analog notification mode.

In a case where the risk notification setting value is set to "0", the HMI control device 425 sets the risk notification to OFF. In other words, when the risk notification setting value is set to "0", the HMI control device 425 does not actuate the HMI 420.

In a case where the risk notification setting value is set to "1", the HMI control device 425 sets the notification mode to the hinting notification mode and, and switches the risk notification to ON in the set notification mode.

In a case where the risk notification setting value is set to "2", the HMI control device 425 sets the notification mode to the analogue notification mode, and switches the risk notification to ON in the set notification mode.

When the notification mode is set to the hinting notification mode, the HMI control device 425 operates the HMI 420 in such a manner as not to annoy the pedestrian, thereby making the pedestrian spontaneously recognize the presence of a risk-carrying subject extracted from the risk information transmitted from the coordination support device 6. More specifically, when the notification mode is set to the hinting notification mode, the HMI control device 425 actuates the vibrator 424 to thereby vibrate the main body of the portable information processing terminal 40 at predetermined amplitude and frequency.

When the notification mode is set to the analogue notification mode, the HMI control device 425 operates the HMI 420 in a different manner from the above-described manner in the hinting notification mode, thereby making the pedestrian to strongly recognize the presence of the risk-carrying subject extracted from the risk information transmitted from the coordination support device 6 and a degree of risk associated with the risk-carrying subject. Thus, in the analogue notification mode, in order to make the pedestrian strongly recognize the presence of the risk-carrying subject, the HMI control device 425 operates the HMI 420 in a manner the notification intensity of which is higher than that of the hinting notification mode. More specifically, when the notification mode is set to the analogue notification mode, the HMI control device 425 causes the speaker 421 to emit, for example, buzzer sound, pulse sound, and a massage informing the pedestrian of the presence of the risk.

As described above, in the analogue notification mode, in order to make the pedestrian strongly recognize not only the presence of a risk-carrying subject but also a degree of the risk associated with the risk-carrying subject, the HMI control device 425 preferably changes the notification intensity in accordance with the degree of the risk associated with the risk-carrying subject (e.g., the length of a predicted period until a possible collision with the risk-carrying subject) extracted from the risk information transmitted from the coordination support device 6.

Specifically, the HMI control device 425 may increase the volume of the buzzer sound, increase the volume of the pulse sound, shorten the interval of the pulse sound, or change the content of the message, as the degree of risk increases (i.e., as the predicted period until the possible collision with the risk-carrying subject shortens).

Referring back to FIG. 2, the infrastructure cameras 56 capture images of the traffic infrastructure in the target traffic area including the roads, the intersection, and the sidewalks as well as the mobile bodies and the pedestrians that move on the roads, the intersection, the sidewalks, and the like, and transmit the obtained image information to the coordination support device 6.

The traffic light control device 55 controls the traffic lights and transmits, to the coordination support device 6, traffic light status information regarding current lighting color of the traffic lights in the target traffic area, a timing at which the lighting color is switched, and the like.

The coordination support device 6 is a computer that assists the traffic participants in moving safely and smoothly in the target traffic area, by generating, for each of the traffic participants to be assisted, coordination support information for prompting each traffic participant to communicate with other traffic participants and recognize the surrounding traffic environment on the basis of the information acquired from the above-described plurality of area terminals present in the target traffic area, and by notifying the generated coordination support information to the traffic participants. Note that among the plural traffic participants in the target traffic area, the targets to be assisted by the coordination support device 6 according to the present embodiment are traffic participants that have means (e.g., notification devices 22, 32, and 42) for receiving the coordination support information generated by the coordination support device 6 and for causing the respective HMI to operate in a manner specified based on the received coordination support information.

The coordination support device 6 includes: a target traffic area recognition unit 60 for recognizing persons and mobile bodies in the target traffic area as individual traffic participants; a driving subject information acquisition unit 61 for acquiring driving subject state information correlating with the driving capability of the driving subject of each mobile body recognized as the traffic participant by the target traffic area recognition unit 60; a prediction unit 62 for predicting the futures of the traffic participants in the target traffic area; a soundness-promoting notification setting unit 63 for setting a soundness-promoting notification to ON or OFF for each of the individual traffic participants recognized as the support targets by the target traffic area recognition unit 60; a risk notification setting unit 64 for setting a notification mode in which a risk notification is provided to each of the individual traffic participants recognized as the support targets by the target traffic area recognition unit 60; a coordination support information notification unit 65 for transmitting the coordination support information generated for each of the individual traffic participants recognized as the support targets by the target traffic area recognition unit 60; a traffic environment database 67 where information regarding the traffic environment in the target traffic area is accumulated; and a driving history database 68 where pre-registered information regarding past driving histories of driving subjects are accumulated.

The traffic environment database 67 stores information regarding the traffic environment surrounding the traffic participants in the target traffic area, such as pre-registered map information of the target traffic area (e.g., the width of the road, the number of lanes, the speed limit, the width of the sidewalk, the presence or absence of a guardrail between the road and the sidewalk, the position of a crosswalk, etc.) and risk area information regarding a high risk area with a particularly high risk in the target traffic area. In the following description, the information stored in the traffic environment database 67 may be referred to as registered traffic environment information.

The driving history database 68 stores pre-registered information regarding past driving histories of driving subjects in association with the registration numbers of the mobile bodies possessed by the driving subjects. Therefore, if the registration number of a recognized mobile body is identified by the target traffic area recognizing unit 60 to be described later, the past driving history of the driving subject of the recognized mobile body can be retrieved by way of search by the registration number through the driving history database 68. In the following description, the information stored in the driving history database 68 may be referred to as registered driving history information.

The target traffic area recognition unit 60 recognizes recognition targets each of which is a traffic participant as a person or a mobile body in the target traffic area, recognizes traffic environment surrounding each traffic participant in the target traffic area, and acquires recognition information regarding the recognition targets, based on the information transmitted from the above-described area terminals (the on-board equipment 20 and 30, the portable information processing terminals 40, the infrastructure cameras 56, and the traffic light control device 55) in the target traffic area and the registered traffic environment information read from the traffic environment database 67.

Here, the information transmitted to the target traffic area recognition unit 60 from the on-board driving assistance device 21 and the on-board communication device 24 included in the on-board equipment 20, and the information transmitted to the target traffic area recognition unit 60 from the on-board driving assistance device 31 and the on-board communication device 34 included in the on-board equipment 30 include, for example, information regarding traffic participants present near the respective host vehicle and a traffic environmental state that have been acquired by the respective external sensor unit, and information regarding a state of the respective host vehicle as one traffic participant that has been acquired by, for example, the host vehicle state sensor and the navigation device. The information transmitted from the portable information processing terminal 40 to the target traffic area recognition unit 60 includes information regarding a state of the pedestrian as one traffic participant, such as a position and travel acceleration. The image information transmitted from the infrastructure cameras 56 to the target traffic area recognition unit 60 includes information regarding the traffic participants and traffic environment surrounding the traffic participants, such as appearance of the traffic infrastructure such as the roads, the intersection, and the sidewalks, and appearance of traffic participants moving in the target traffic area. The traffic light status information transmitted from the traffic light control device 55 to the target traffic area recognition unit 60 includes information regarding the traffic environment surrounding the traffic participants, such as current lighting color of the traffic lights and a timing for switching the lighting color. The registered traffic environment information that the target traffic area recognition unit 60 reads from the traffic environment database 67 includes information regarding the traffic environment surrounding the traffic participants, such as map information, the risk area information, etc. of the target traffic area.

Thus, the target traffic area recognition unit 60 can acquire, based on the information transmitted from the foregoing area terminals, recognition information regarding each traffic participant (hereinafter, referred to also as "traffic participant recognition information"), such as a position, a moving speed, a moving direction, a moving direction, etc. of each traffic participant in the target traffic area, vehicle type and rank, the registration number, etc. of each mobile body, the number of persons forming a pedestrian group, and age groups, etc. of the pedestrians. The target traffic area recognition unit 60 can further acquire, based on the information transmitted from the foregoing area terminals, recognition information regarding the traffic environment surrounding each traffic participant (hereinafter, referred to also as "traffic environment recognition information") in the target traffic area, such as the width of the road, the number of lanes, the speed limit, the width of the sidewalk, the presence or absence of a guardrail between the road and the sidewalk, lighting color of the traffic light, a timing for switching the lighting color, and the risk area information.

Accordingly, in the present embodiment, a recognizer that recognizes the traffic participants and the traffic environment in the target traffic area includes: the target traffic area recognition unit 60; the on-board driving assistance device 21, the on-board communication device 24, and the portable information processing terminal 25 that are included in the on-board equipment 20 of the four-wheeled automobile 2; the on-board driving assistance device 31, the on-board communication device 34, and the portable information processing terminal 35 that are included in the on-board equipment 30 of the motorcycle 3; the portable information processing terminal 40 of the pedestrian 4; the infrastructure cameras 56; the traffic light control device 55; and the traffic environment database 67.

The target traffic area recognition unit 60 transmits the traffic participant recognition information and the traffic environment recognition information acquired in the manner described above to the driving subject information acquisition unit 61, the prediction unit 62, the soundness-promoting notification setting unit 63, the risk notification setting unit 64, the coordination support information notification unit 65, etc.

The driving subject information acquisition unit 61 acquires driving subject state information and driving subject characteristic information that correlate with current driving capabilities of the driving subjects of the mobile bodies recognized as the traffic participants by the target traffic area recognition unit 60, based on the information transmitted from the above-described area terminals (in particular, the on-board equipment 20 and 30) in the target traffic area and the registered driving history information read from the driving history database 68.

More specifically, in a case where a person is the driving subject of the four-wheeled automobile recognized as the traffic participant by the target traffic area recognition unit 60, the driving subject information acquisition unit 61 acquires information transmitted from the on-board equipment 20 mounted on the four-wheeled automobile as the driving subject state information of the driver. In a case where a person is the driving subject of the motorcycle recognized as the traffic participant by the target traffic area recognition unit 60, the driving subject information acquisition unit 61 acquires information transmitted from the on-board equipment 30 mounted on the motorcycle as the driving subject state information of the rider.

Here, the information that is transmitted to the driving subject information acquisition unit 61 from the driving subject state sensor 23 and the on-board communication device 24 included in the on-board equipment 20 contains time-series data correlating with the driving capability of the driver engaged in driving. The time-series data includes, for example, appearance information such as a direction of a sight line of the driver engaged in driving and whether or not the driver's eyes are open, biometric information such as a pulse, whether or not the driver is breathing, and a skin potential, and speech information such as whether or not there is conversation. The information that is transmitted to the driving subject information acquisition unit 61 from the rider state sensor 33 and the on-board communication device 34 included in the on-board equipment 30 contains time-series data correlating with the driving capability of the rider engaged in driving. The time-series data includes, for example, biometric information such as a pulse of the rider, whether or not the rider is breathing, and a skin potential. The information that is transmitted to the driving subject information acquisition unit 61 from the portable information processing terminals 25 and 35 included in the on-board equipment 20 and 30 contains personal schedule information of the driver and that of the rider. For example, in a case where the driver and the rider are driving the respective mobile bodies according to a tight schedule, the driver and the rider may be hasty, and their driving capabilities may degrade. Thus, the personal schedule information of the driver and that of the rider are considered to be information correlating with their driving capabilities.

The driving subject information acquisition unit 61 acquires, by using both or one of the driving subject state information regarding the driving subject acquired through the above procedure and the registered driving history information read from the driving history database 68, the driving subject characteristic information relating to the driving characteristics of the driving subject (e.g., sudden lane changes with excessive frequency and sudden acceleration and deceleration with excessive frequency) and correlating with the current driving capability of the driving subject engaged in driving.

The driving subject information acquisition unit 61 transmits the driving subject state information and the driving subject characteristic information of the driving subject acquired in the way described above to the prediction unit 62, the soundness-promoting notification setting unit 63, the risk notification setting unit 64, the coordination support information notification unit 65, etc.

The prediction unit 62 extracts a part of the target traffic area as a monitoring area, and predicts the futures of a plurality of traffic participants in the monitoring area, based on the traffic participant recognition information and the traffic environment recognition information acquired by the target traffic area recognition unit 60 and the driving subject state information and the driving subject characteristic information acquired by the driving subject information acquisition unit 61. More specifically, the prediction unit 62 constructs a virtual space simulating the monitoring area based on the traffic participant recognition information and the traffic environment recognition information acquired by the target traffic area recognition unit 60, and predicts the future of each traffic participant in the monitoring area by performing a simulation in the virtual space based on the traffic participant recognition information, the traffic environment recognition information, the driving subject state information, and the driving subject characteristic information. A detailed description of a specific procedure for the prediction unit 62 to predict the future of each traffic participant in the monitoring area is omitted herein.

Here, the target traffic area has a relatively large range that is determined, for example, in units of municipalities. On the other hand, the monitoring area is a traffic area such as, for example, an area in the vicinity of an intersection or a specific facility, through which a four-wheeled automobile traveling at a legal speed can pass within about a few tens of seconds. In other words, the monitoring area is smaller than the target traffic area, but is larger than the ADAS actuation range set by the driving support ECU mounted on each mobile body.

From among the plural traffic participants present in the target traffic area, the soundness-promoting notification setting unit 63 sets, as setting targets, traffic participants recognized as support targets being mobile bodies by the target traffic area recognition unit 60, and sets the soundness-promoting notification to ON or OFF for each individual setting target.

More specifically, the soundness-promoting notification setting unit 63 first acquires, from the driving subject information acquisition unit 61, the driving subject state information and the driving subject characteristic information associated with the driving subject of each setting target that is the mobile body. The soundness-promoting notification setting unit 63 calculates a current degree of soundness of the driving subject for each setting target, based on the acquired driving subject state information and driving subject characteristic information. In a case where the calculated degree of soundness of one setting target is less than a predetermined soundness threshold, the soundness-promoting notification setting unit 63 determines that the driving subject of the one setting target is in an unsound state, and sets the soundness-promoting notification setting value for the setting object to "1" in order to set the soundness-promoting notification for the setting object to ON. In a case where the calculated degree of soundness of one setting target is higher than the predetermined soundness threshold, the soundness-promoting notification setting unit 63 determines that the driving subject of the one setting target is in a sound state, and sets the soundness-promoting notification setting value for the setting object to "0" in order to set the soundness-promoting notification for the setting object to OFF.

The soundness-promoting notification setting unit 63 sets the soundness-promoting notification for each of the plurality of setting targets in the target traffic area to ON or OFF by way of the above-described procedure. The information regarding the soundness-promoting notification setting value that has been set for each setting target by the soundness-promoting notification setting unit 63 is transmitted to the coordination support information notification unit 65.

From among the plural traffic participants present in the monitoring area that has been extracted from the target traffic area by the prediction unit 62, the risk notification setting unit 64 determines, as setting targets, the traffic participants recognized as the support targets by the target traffic area recognition unit 60, and sets the risk notification to ON or OFF and sets a notification mode for each individual setting target.

More specifically, for each individual setting target in the monitoring area, the risk notification setting unit 64 sets the risk notification to ON or OFF and specifies a notification mode based on information related to the monitoring area contained in the traffic participant recognition information and the traffic environment recognition information acquired by the target traffic area recognition unit 60, information related to the monitoring area contained in the driving subject state information and the driving subject characteristic information acquired by the driving subject information acquisition unit 61, and prediction results regarding the monitoring area provided by the prediction unit 62.

In the following description, a specific procedure for the risk notification setting unit 64 to set the risk notification to ON or OFF and to specify a notification mode for each setting target will be described with reference to an example case in which the road R1 illustrated in FIG. 4 is determined as the monitoring area.

FIG. 4 is a schematic diagram illustrating an intersection of the road R1 and the vicinity thereof that are determined as a monitoring area, and explaining a situation in which four-wheeled automobiles 2 and 5 and a motorcycle 3 are present in the monitoring area. In the example illustrated in FIG. 4, the monitoring area includes the road having one lane on each side and a road meeting the road at the intersection, and the four-wheeled automobile 2 as a support target is traveling on one lane of the road, while the motorcycle 3 as a second mobile body is traveling on the other lane opposite to the lane where the four-wheeled automobile 2 is traveling.

The four-wheeled automobile 5 as a third mobile body and the motorcycle 3 are traveling on the same lane in the same direction. The four-wheeled automobile 2 is going to turn right at the intersection in the monitoring area, whereas the motorcycle 3 is going to move straight ahead through the intersection, while the four-wheeled automobile 5 is traveling in front of the motorcycle 3.

In this situation, it is difficult for the driver of the four-wheeled automobile 2 to recognize the presence of the motorcycle 3 because the four-wheeled automobile 5 shields the motorcycle 3. If the motorcycle 3 slides past a side of the four-wheeled automobile 5, there is a possibility of a collision between the four-wheeled automobile 2 turning right and the motorcycle 3 moving straight ahead.

In the example illustrated in FIG. 4, in a case where the motorcycle 3 is present outside the analog notification actuation range encompassing the ADAS actuation range and acts as an oncoming mobile body approaching the four-wheeled automobile 2 from the front in the traveling direction of the four-wheeled automobile 2, and the four-wheeled automobile 5 is present near the motorcycle 3 and is approaching the four-wheeled automobile 2 from the front in the traveling direction of the four-wheeled automobile 2, the risk notification setting unit 64 sets the notification mode of the risk notification control device 227 of the four-wheeled automobile 2 to the hinting notification mode. When the four-wheeled automobile 2 and the motorcycle 3 have further approached each other and the motorcycle 3 is present within the analog notification actuation range, the risk notification setting unit 64 sets the notification mode of the risk notification control device 227 to the analog notification mode.

The analog notification actuation range encompasses the ADAS actuation range, and is an actuation range where the risk notification is provided in the analog notification mode in response to shortening of the distance between the motorcycle 3 and the four-wheeled automobile 2. That is, the analog notification actuation range is larger than the ADAS actuation range.

As described above, the risk notification setting unit 64 sets the risk notification setting value to be inputted to each of the risk notification control device 227 and the risk notification control device 327 to "1" to thereby set the notification mode of each of the risk notification control device 227 and the risk notification control device 327 to the hinting notification mode. The risk notification setting unit 64 sets the risk notification setting value to be inputted to each of the risk notification control device 227 and the risk notification control device 327 to "2" to thereby set the notification mode of each of the risk notification control device 227 and the risk notification control device 327 to the analogue notification mode.

In a case where the four-wheeled automobile 5 is present outside a predetermined range between the motorcycle 3 and the four-wheeled automobile 5, the risk notification setting unit 64 sets the notification mode of the risk notification control device 227 to the hinting notification mode. Here, the predetermined range between the motorcycle 3 and the four-wheeled automobile 5 is a range set with respect to the width direction of each vehicle, and indicates that the motorcycle 3 and the four-wheeled automobile 5 are almost on a line in the front-rear direction. In other words, being present outside the predetermined range between the motorcycle 3 and the four-wheeled automobile 5 indicates that the motorcycle 3 is at a relative distance in the width direction from the four-wheeled automobile 5, and the motorcycle 3 can slide past a side of the four-wheeled automobile 5.

In a case where the recognizer recognizes that a traffic environment in the monitoring area is in a predetermined state, the risk notification setting unit 64 sets the notification mode of the risk notification control device 227 to the hinting notification mode. Here, the predetermined state includes a state in which the road in the monitoring area is congested, a state in which the road shoulder of the road in the monitoring area is wide, a state in which the width of the road in the monitoring area is wide, and the like. Under such a predetermined state, the rider on the motorcycle 3 tends to slide past a side of the four-wheeled automobile 5 to move ahead.

As described above, the recognizer includes the target traffic area recognition unit 60; the on-board driving assistance device 21, the on-board communication device 24, and the portable information processing terminal 25 included in the on-board equipment 20 of the four-wheeled automobile 2; the on-board driving assistance device 31, the on-board communication device 34, and the portable information processing terminal 35 included in the on-board equipment 30 of the motorcycle 3; the portable information processing terminal 40 of the pedestrian 4; the infrastructure cameras 56; the traffic light control device 55; and the traffic environment database 67.

The risk notification setting unit 64 sets the notification mode of the risk notification control device 227 to the hinting notification mode in a case where the driving subject characteristic information regarding the rider of the motorcycle 3 acquired by the driving subject information acquisition unit 61 indicates a characteristic that the motorcycle 3 slides past a side of another mobile body upon approaching the other mobile body.

The prediction unit 62 predicts the futures of the four-wheeled automobile 2 and the motorcycle 3 in the monitoring area based on the traffic participant recognition information and the traffic environment recognition information acquired by the target traffic area recognition unit 60 and the driving subject state information and the driving subject characteristic information acquired by the driving subject information acquisition unit 61. More specifically, the prediction unit 62 predicts a first predictive travel route along which the four-wheeled automobile 2 in the monitoring area is predicted to travel in the future and a second predictive travel route along which the motorcycle 3 in the monitoring area is predicted to travel in the future, based on the traffic participant recognition information, the traffic environment recognition information, the driving subject state information, and the driving subject characteristic information.

In a case where the first predictive travel route for the four-wheeled automobile 2 and the second predictive travel route for the motorcycle 3, which have been predicted by the prediction unit 62, overlap with each other, the risk notification setting unit 64 sets the notification mode of the risk notification control device 227 to the analog notification mode. For example, in the example illustrated in FIG. 4, if the first predictive travel route for the four-wheeled automobile 2 going to turn right overlaps with the second predictive travel route for the motorcycle 3 going to move straight ahead, the risk notification setting unit 64 sets the notification mode of the risk notification control device 227 to the analog notification mode.

The risk notification setting unit 64 sets the notification mode of the risk notification control device 227 to the hinting notification mode in a case where the motorcycle 3 is present outside the analogue notification actuation range encompassing the ADAS actuation range and it is determined, based on recognition results from the recognizer, that there is a possibility that the motorcycle 3 slides past a side of the four-wheeled automobile 5 upon approaching the four-wheeled automobile 5. The risk notification setting unit 64 sets the notification mode of the risk notification control device 227 to the analogue notification mode in a case where the motorcycle 3 is present within the analog notification actuation range.

In the above example, the risk notification setting unit 64 sets the notification mode of the risk notification control device 227 to the hinting notification mode or the analog notification mode, but the present invention is not limited thereto. The risk notification setting unit 64 may set the risk notification control device 227 and the risk notification control device 327 to the hinting notification mode or the analog notification mode.

Reference is made to FIG. 2 again. Based on the traffic participant recognition information and the traffic environment recognition information acquired by the target traffic area recognition unit 60, the driving subject state information and the driving subject characteristic information acquired by the driving subject information acquisition unit 61, the prediction results provided by the prediction unit 62, the information regarding the soundness-promoting setting value set by the soundness-promoting notification setting unit 63, and the information regarding the risk setting value set by the risk notification setting unit 64, the coordination support information notification unit 65 generates coordination support information for prompting the individual traffic participants, which have been recognized as the support targets by the target traffic area recognition unit 60, to communicate with nearby traffic participants and to recognize the surrounding traffic environment, and then, transmits the generated coordination support information to each traffic participant.

The coordination support information transmitted from the coordination support information notification unit 65 to each support target includes information regarding a soundness-promoting setting value, information regarding a risk notification setting value, and risk information regarding a risk imminent to each support target. Here, the risk information includes, for example, the prediction results provided by the prediction unit 62, information regarding the position of traffic participants present near each traffic participant.

The traffic safety support system 1 according to the present embodiment exerts the following effects.

(1) In the traffic safety support system 1, the risk notification control device 227 operates the HMI 220 in the first notification manner in a case where the notification mode is set to the hinting notification mode, and operates the HMI 220 in the second notification manner the notification intensity of which is higher than that of the first notification manner in a case where the notification mode is set to the analog notification mode. The risk notification setting unit 64 sets the notification mode of the risk notification control device 227 to the hinting notification mode in a case where the motorcycle 3 is present outside the analog notification actuation range encompassing the ADAS actuation range and acts as an oncoming mobile body approaching the four-wheeled automobile 2 from the front in the traveling direction of the four-wheeled automobile 2 and where the four-wheeled automobile 5 is present near the motorcycle 3 and is approaching the four-wheeled automobile 2 from the front in the traveling direction of the four-wheeled automobile 2. The risk notification setting unit 64 sets the notification mode of the risk notification control device 227 to the analogue notification mode in a case where the motorcycle 3 is present within the analog notification actuation range.

Due to this feature, the traffic safety support system 1 can provide a notification in the first notification manner in advance when the four-wheeled automobile 5 is present near the motorcycle 3, and can provide a notification in the second notification manner when the motorcycle 3 has approached the four-wheeled automobile 2. Therefore, in a situation in which it is predicted that the motorcycle 3 is shielded by the four-wheeled automobile 5, the traffic safety support system 1 provides, in advance, a notification in the first notification manner the notification intensity of which is less than that of the second notification manner, thereby achieving both mitigation of annoyance caused by the notification to the driver of the four-wheeled automobile 2 and securing of the traffic safety for the four-wheeled automobile 2 and the motorcycle 3.

(2) In the traffic safety support system 1, in the case where the notification mode of the risk notification control device 227 is set to the analog notification mode, the risk notification setting unit 64 changes the notification intensity in accordance with a degree of risk between the four-wheeled automobile 2 and the motorcycle 3. Due to this feature, when the degree of risk is high, the traffic safety support system 1 can notify with high intensity the approach of the motorcycle 3 as the second mobile body to the driver of the four-wheeled automobile 2, whereas when the degree of risk is low, the traffic safety support system 1 can notify the presence of the second mobile body to the driver at a level not annoying the driver.

(3) In the traffic safety support system 1, in a case where the four-wheeled automobile 5 is present outside the predetermined range between the motorcycle 3 and the four-wheeled automobile 5, the risk notification setting unit 64 sets the notification mode of the risk notification control device 227 to the hinting notification mode. Due to this feature, when the four-wheeled automobile 5 is present outside the predetermined range between the motorcycle 3 and the four-wheeled automobile 5, for example, when the motorcycle 3 is going to slide past a side of the four-wheeled automobile 5, the traffic safety support system 1 can provide a notification to the driver in advance, thereby ensuring safety.

(4) In the traffic safety support system 1, the risk notification setting unit 64 sets the notification mode of the risk notification control device 227 to the hinting notification mode in a case where the traffic environment in the monitoring area recognized by the recognizer is in the predetermined state. Due to this feature, in a case where the road in the monitoring area is congested, the traffic safety support system 1 can provide in advance the driver of the four-wheeled automobile 2 with a notification that there is the possibility that the motorcycle 3 slides past a side of the four-wheeled automobile 5, thereby ensuring safety.

(5) In the traffic safety support system 1, the risk notification setting unit 64 sets the notification mode of the risk notification control device 227 to the hinting notification mode in a case where the driving subject characteristic information regarding the rider of the motorcycle 3 acquired by the driving subject information acquisition unit 61 indicates a characteristic that the motorcycle 3 slides past a side of another mobile body upon approaching the other mobile body. Due to this feature, in the case where the driving subject characteristic information regarding the rider of the motorcycle 3 indicates a characteristic that the motorcycle 3 slides past a side of another mobile body, the traffic safety support system 1 can provide in advance the driver of the four-wheeled automobile 2 with a notification that there is the possibility that the motorcycle 3 slides past a side of the four-wheeled automobile 5, thereby ensuring safety.

(6) In the traffic safety support system 1, the risk notification setting unit 64 further includes the prediction unit 62 for predicting the futures of the mobile bodies recognized as the traffic participants by the recognizer, and the risk notification setting unit 64 sets the notification mode of the risk notification control device 227 to the analog notification mode in a case where the first predictive travel route for the four-wheeled automobile 2 and the second predictive travel route for the motorcycle 3, which have been predicted by the prediction unit 62, overlap with each other. The risk notification setting unit 64 sets the notification mode of the risk notification control device 227 to the analogue notification mode when the first predictive travel route for the four-wheeled automobile 2 and the second predictive travel route for the motorcycle 3 overlap with each other, that is, when a movement vector of the four-wheeled automobile 2 and a movement vector of the motorcycle 3 overlap with each other. Due to this feature, the traffic safety support system 1 can provide a notification in the analog notification mode in the case where the movement vector of the four-wheeled automobile 2 as the support target overlaps with the movement vector of the motorcycle 3. That is, the traffic safety support system 1 can provide a notification in the analog notification mode when there is a possibility that the four-wheeled automobile 2 and the motorcycle 3 collide with each other, thereby achieving both mitigation of annoyance caused by the notification to the driver and securing of the traffic safety.

(7) In the traffic safety support system 1, the second mobile body is a two-wheeled vehicle such as a motorcycle 3. Due to this feature, in a situation in which the host vehicle being the first mobile body turns right or moves straight ahead while the motorcycle 3 being the second mobile body turns right or moves straight ahead, the traffic safety support system 1 can achieve both mitigation of annoyance caused by the notification to the driver and securing of the traffic safety.

(8) In the traffic safety support system 1, the four-wheeled automobile 2, which is a support target, includes the on-board driving assistance device 21 that automatically operates at least one of a braking device or a steering device of the four-wheeled automobile 2 on the condition that a mobile body that may come into contact with the four-wheeled automobile 2 is present within the ADAS actuation range. Due to this feature, the traffic safety support system 1 can reduce, by means of the on-board driving assistance device 21, the possibility that the four-wheeled automobile 2 and the motorcycle 3 collide with each other, and can secure the traffic safety.

(9) In the traffic safety support system 1, the risk notification control device 227 operates the HMI 220 in the first notification manner in a case where the notification mode is set to the hinting notification mode, and operates the HMI 220 in the second notification manner the notification intensity of which is higher than that of the first notification manner in a case where the notification mode is set to the analog notification mode. The risk notification setting unit 64 sets the notification mode of the risk notification control device 227 to the hinting notification mode in a case where the motorcycle 3 is present outside the analogue notification actuation range and where it is determined, based on recognition results from the recognizer, that there is a possibility that the motorcycle 3 slides past a side of the four-wheeled automobile 5 upon approaching the four-wheeled automobile 5. The risk notification setting unit 64 sets the notification mode of the risk notification control device 227 to the analogue notification mode in a case where the motorcycle 3 is present within the analog notification actuation range. Due to this feature, when it is determined that there is the possibility that the motorcycle 3 slides past a side of the four-wheeled automobile 5 upon approaching the four-wheeled automobile 5, the traffic safety support system 1 can provide a notification in the first notification manner in advance, and can provide a notification in the second notification manner when the motorcycle 3 has approached the four-wheeled automobile 2. Thus, in a situation in which it is predicted that the motorcycle 3 is shielded by the four-wheeled automobile 5, the traffic safety support system 1 can achieve both mitigation of annoyance caused by the notification to the driver and securing of the traffic safety by means of the first notification manner in which the notification is provided in advance and the notification of which intensity is less than the second notification manner.

While one embodiment of the present invention had been described above, it should be noted that the present invention is not limited to the embodiment described above. Appropriate modification may be made to the specifics of the present invention without deviating from the spirit of the present invention. For example, the above embodiment has been described with reference to the case where the coordination support device 6 capable of wireless communication with the support target includes a recognizer for recognizing the traffic participants and a traffic environment in the monitoring area surrounding the support target that is a mobile body and the notification mode specifier for setting the notification mode for the support target, as the target traffic area recognition unit 60 and the risk notification setting unit 64, respectively. However, the present invention is not limited to this case. The recognizer and the notification mode specifier may be constituted by on-board devices mounted on the support target. In this case, the range of the monitoring area recognized by the recognizer is limited to a range recognizable by the external sensor mounted on the support target, but there is an advantage that delay due to communication is small.

EXPLANATION OF REFERENCE NUMERALS

1: Traffic safety support system
9: Target traffic area

2: Four-wheeled automobile (First mobile body, Traffic participant)
20: On-board equipment
21: On-board driving assistance device (Recognizer, Driving assistor)
22: Notification device
23: Driving subject state sensor
24: On-board communication device (Recognizer)
25: Portable information processing terminal (Recognizer)
3: Motorcycle (Second mobile body, Traffic participant)
30: On-board equipment
31: On-board driving assistance device (Recognizer, Driving assistor)
32: Notification device
33: Rider state sensor
34: On-board communication device (Recognizer)
35: Portable information processing terminal (Recognizer)
4: Pedestrian (Person, Traffic participant)
40: Portable information processing terminal (Recognizer)
51: Road (Traffic environment)
52: Intersection (Traffic environment)
53: Sidewalk (Traffic environment)
54: Traffic light (Traffic environment)
55: Traffic light control device (Recognizer)
56: Infrastructure camera (Recognizer)
6: Coordination support device
60: Target traffic area recognition unit (Recognizer)
61: Driving subject information acquisition unit
62: Prediction unit (Predictor)
63: Soundness-promoting notification setting unit
64: Risk notification setting unit (Notification mode specifier)
65: Coordination support information notification unit
67: Traffic environment database (Recognizer)
68: Driving history database
220: HMI (Human-machine interface)
225: HMI control device
226: Soundness-promoting control device
227: Risk notification control device (Notification controller)
320: HMI (Human-machine interface)
325: HMI control device
326: Soundness-promoting control device
327: Risk notification control device (Notification controller)
420: HMI (Human-machine interface)
425: HMI control device

What is claimed is:

1. A traffic safety support system for assisting a driver in driving a support target being a first mobile body, the traffic safety support system comprising:
   a recognizer configured to recognize a traffic participant and a traffic environment in a monitoring area surrounding the support target;
   a human-machine interface configured to be operated in a manner perceptible to the driver;
   a notification mode specifier configured to set a notification mode of the human-machine interface based on a recognition result from the recognizer during a period in which presence of a second mobile body outside a first range is recognized by the recognizer, the first range being inside the monitoring area and centered around the support target; and
   a notification controller configured to operate the human-machine interface in a first notification manner in a case where the notification mode is set to a first mode, and operate the human-machine interface in a second notification manner a notification intensity of which is higher than that of the first notification manner in a case where the notification mode is set to a second mode,
   wherein the notification mode specifier sets the notification mode to the first mode in a case where the second mobile body is present outside a second range encompassing the first range and acts as an oncoming mobile body approaching the support target from front in a traveling direction of the support target and where a third mobile body is present near the second mobile body and is approaching the support target from the front in the traveling direction of the support target, and
   the notification mode specifier sets the notification mode to the second mode in a case where the second mobile body is present within the second range.

2. The traffic safety support system according to claim 1, wherein in the case where the notification mode is set to the second mode, the notification mode specifier changes the notification intensity in accordance with a degree of risk between the support target and the second mobile body.

3. The traffic safety support system according to claim 1, wherein in a case where the third mobile body is present outside a predetermined range between the second mobile body and the third mobile body, the notification mode specifier sets the notification mode to the first mode.

4. The traffic safety support system according to claim 1, wherein in a case where the traffic environment in the monitoring area recognized by the recognizer is in a predetermined state, the notification mode specifier sets the notification mode to the first mode.

5. The traffic safety support system according to claim 1, further comprising a driving subject characteristic acquirer configured to acquire driving subject characteristic information regarding a driver of the second mobile body,
   wherein in a case where the driving subject characteristic information regarding the driver of the second mobile body acquired by the driving subject characteristic acquirer indicates a characteristic that the second mobile body slides past a side of an other mobile body upon approaching the other mobile body, the notification mode specifier sets the notification mode to the first mode.

6. The traffic safety support system according to claim 1, further comprising a predictor configured to predict futures of mobile bodies recognized as traffic participants by the recognizer,
   wherein in a case where a first predictive travel route for the support target predicted by the predictor and a second predictive travel route for the second mobile body predicted by the predictor overlap with each other, the notification mode specifier sets the notification mode to the second mode.

7. The traffic safety support system according to claim 1, wherein the second mobile body is a two-wheeled vehicle.

8. The traffic safety support system according to claim 1, wherein the support target comprises a driving assistor configured to automatically operate at least one of a braking device or a steering device of the support target on a condition that a mobile body that has possibility of coming into contact with the support target is present within the first range.

9. A traffic safety support system for assisting a driver in driving a support target being a first mobile body, the traffic safety support system comprising:
- a recognizer configured to recognize a traffic participant and a traffic environment in a monitoring area surrounding the support target;
- a human-machine interface configured to be operated in a manner perceptible to the driver;
- a notification mode specifier configured to set a notification mode of the human-machine interface based on a recognition result from the recognizer during a period in which presence of a second mobile body outside a first range is recognized by the recognizer, the first range being inside the monitoring area and centered around the support target; and
- a notification controller configured to operate the human-machine interface in a first notification manner in a case where the notification mode is set to a first mode, and operate the human-machine interface in a second notification manner a notification Intensity of which is higher than that of the first notification manner in a case where the notification mode is set to a second mode, wherein the notification mode specifier sets the notification mode to the first mode in a case where the second mobile body is present outside a second range encompassing the first range and it is determined, based on a recognition result from the recognizer, that there is a possibility that the second mobile body slides past a side of a third mobile body present near the second mobile body upon approaching the third mobile body, and the notification mode specifier sets the notification mode to the second mode in a case where the second mobile body is present within the second range.

* * * * *